United States Patent [19]

Haraki et al.

[11] Patent Number: 5,369,572
[45] Date of Patent: Nov. 29, 1994

[54] RADIOGRAPHIC IMAGE PROCESSING METHOD WHEREIN SMALL VARIATION OF DENSITY IS SELECTIVELY MADE CLEAR

[75] Inventors: Takahiro Haraki, Kawasaki; Shiro Takeda; Fumihiro Namiki; Hideyuki Hirano; Kenji Ishiwata, all of Kawasaki, Japan

[73] Assignee: Fujitsu Limited, Kawasaki, Japan

[21] Appl. No.: 856,138

[22] Filed: Mar. 20, 1992

[30] Foreign Application Priority Data

Mar. 20, 1991 [JP] Japan .................................. 3-057409
Mar. 5, 1992 [JP] Japan .................................. 4-048825

[51] Int. Cl.⁵ ............................................ G06F 15/68
[52] U.S. Cl. ............................ 364/413.13; 364/413.14; 364/413.15; 364/413.17; 364/413.18; 364/413.23; 382/54; 382/6; 348/571
[58] Field of Search ................ 364/413.13, 413.23, 364/413.14, 413.17, 413.15, 413.18; 382/54, 6; 358/166, 111

[56] References Cited

U.S. PATENT DOCUMENTS

| | | | |
|---|---|---|---|
| 4,231,065 | 10/1980 | Fitch et al. | 358/166 |
| 4,760,460 | 7/1988 | Shimotohno | 358/261 |
| 4,789,933 | 12/1988 | Chen et al. | 364/413.13 |
| 4,794,531 | 12/1988 | Morishita et al. | 364/413 |
| 4,839,726 | 6/1989 | Balopole et al. | 358/166 |
| 5,136,372 | 8/1992 | Nakatani et al. | 358/80 |

FOREIGN PATENT DOCUMENTS 0451579  10/1991  European Pat. Off. .

*Primary Examiner*—Roy N. Envall, Jr.
*Assistant Examiner*—Joseph Thomas
*Attorney, Agent, or Firm*—Staas & Halsey

[57] ABSTRACT

A method for processing a radiographic image, containing: a step for calculating an average $S_m$ of original image data of an averaging area around each pixel of the radiographic image; and a step for transforming the original image data S of each pixel of the radiographic image to obtain a processed image data Q of each pixel in accordance with an equation, $Q = S + f(S - S_m)$, where $f(S - S_m)$ has a characteristic in at least one of first and second ranges of the difference $S - S_m$, the difference $S - S_m$ is positive in the first range and negative in the second range, and according to the above characteristic, the absolute value $|Q - S|$ varies in accordance with an increasing monotonic function of the absolute value $|S - S_m|$ when the absolute value $|S - S_m|$ is less than a predetermined value, and the absolute value $|Q - S|$ varies in accordance with a decreasing monotonic function of the absolute value $|S - S_m|$ when the absolute value $|S - S_m|$ of the difference $S - S_m$ is more than the predetermined value. The above function $f(S - S_m)$ may be a non-odd function of the difference $S - S_m$.

20 Claims, 17 Drawing Sheets

PIXELS ON A LINE

RADIOGRAPHIC IMAGE PROCESSING METHOD WHEREIN SMALL VARIATION OF DENSITY IS SELECTIVELY MADE CLEAR

BACKGROUND OF THE INVENTION (1) Field of the Invention

The present invention relates to a radiographic image processing method wherein space-frequency processing of a radiographic image of an object, typically a human body is carried out.

(2) Description of the Related Art

Conventionally, there are two methods for diagnosing a human body by radiography. In one method, X-rays transmitted through a human body are applied to a fluorescent screen to transform the X-rays to visible rays, then the visible rays are applied to a silver film to form a latent image, and the latent image is developed to obtain a radiograph. The radiographic image is photoelectrically read by a film reader device for electronically processing the radiographic image to improve the quality of the radiographic image.

In the other method, X-rays transmitted through a human body are applied to an accelerated phosphorescent (which may be called photo-stimulable phosphor, or storage phosphor) plate to store a radiographic image therein, and then the radiographic image is photoelectrically read from the accelerated phosphorescent plate by applying excitation rays thereto for electronically processing the radiographic image to improve the quality of the radiographic image. The above method using the accelerated phosphorescent plate is disclosed in the U.S. Pat. No. 5,859,527.

However, for example, when the conventional radiograph of the chest is processed so that the contrast in an image of a lungfield is good, only images of blood vessels are visible as low density portions in the lungfield of a high density, but images of other portions such as a mediastinum, a diaphragm, and a body of vertebra, are not visible because of very low density thereof. Otherwise, when the conventional radiograph is processed so that contrasts in images of portions other than a lungfield are good, the images of blood vessels in the lungfield are not visible because of a very high density thereof. This is because the dynamic ranges of human eyes, silver films, and the accelerated phosphorescent plate.

Generally, diseases may occur in every portion of a human body, and therefore, it is desirable that every portion in a radiographic image is sufficiently visible in a radiographic image for a person diagnosing the human body.

In the conventional method for processing a radiographic image, image data S of each pixel (i, j) in a radiographic image containing l×m pixels is transformed to a processed image data Q as follows, where i=1 to l and j=1 to m. An average of image data of an averaging area containing l×m pixels including the pixel (i, j) in the center thereof. The image data S of each pixel (i, j) in a radiographic image containing l×m pixels is transformed to a processed image data Q in accordance with the following relationship, $$Q = S + K \cdot (S - S_m) \quad (1)$$

where K (K>1) is a constant for enhancing a high space-frequency component in a radiographic image. Here, a degree of enhancement is defined as $|Q-S|$. In accordance with the equation (1), the degree of enhancement $|Q-S|$ is expressed as, $$|Q-S| = K \cdot |S - S_m|. \quad (2)$$

FIG. 1 is a diagram indicating space-frequency characteristics of an original image data S, an average $S_m$, a processed image data Q, and a difference between the original image data S and the average $S_m$. As indicated in FIG. 1, the difference $S - S_m$ between the original image data S and the average $S_m$ is a component wherein a high space-frequency component is enhanced. Namely, the above transformation in accordance with the equation (2) enhances the high space-frequency component in the original image data S.

FIG. 2 is a diagram indicating a relationship between original pixel values S of the image data and processed pixel values Q of the processed image data, and a relationship between the original pixel values S of the image data and the degree of enhancement $|Q-S|$, where the original pixel values S vary from 0 to 1023, and the average $S_m$ is assumed to be 511. As indicated in FIG. 2, according to the above conventional method for processing a radiographic image, the degree of enhancement $|Q-S|$ becomes a very large value when the difference $S - S_m$ between the original image data S and the average $S_m$ is large. Namely, according to the above method, a portion which originally seems to be a sharp edge is transformed to be an excessively sharp edge. When a doctor inspects a radiographic image, the attention of the doctor tends to be attracted to the sharp edge, and a small variation of the density in the radiographic image tends to be overlooked by the doctor, while the image of a lung tumor may appear in a lungfield as a area of density which is a slightly smaller than the density of a sound lungfield. That is, the lung tumor tends to be overlooked by the conventional processing method as explained above.

To improve the above drawback, the Japanese Unexamined Patent Publication No. 56-104645 discloses a technique wherein image data S of each pixel in a radiographic image is transformed to processed image data Q in accordance with the following relationship, $$Q = S + g(S - S_m) \quad (3)$$

where $g(S - S_m)$ is an odd increasing monotonic function of the difference between the original image data S and the average $S_m$. Since the function $g(S - S_m)$ used in the equation (3) varies in accordance with an increasing monotonic function as indicated in FIG. 3 as an example, the drawback that a small variation of the density in the radiographic image tends to be overlooked by the doctor because the attention of the doctor is attracted by the other sharp edge, is relieved slightly but not sufficiently.

In addition, since the above function $g(S - S_m)$ used in the equation (3) is an odd function, the degree of enhancement $|Q-S|$ is the same whether the difference $S - S_m$ between the original image data S and the average $S_m$ is larger or smaller than zero.

SUMMARY OF THE INVENTION

An object of the present invention is to provide a radiographic image processing method wherein an oversight of a small variation of the density in the radiographic image by the doctor is prevented, and in particular, visibility of an image of a tumor in a radiographic image of the chest is improved.

According to the first aspect of the present invention, there is provided a method for processing a radiographic image, comprising: a step for calculating an average ($S_m$) of original image data of an averaging area around each pixel of the above radiographic image; and a step for transforming the original image data of each pixel of the above radiographic image to obtain a processed image data of each pixel in accordance with an equation, $$Q = S + f(S - S_m) \quad (4)$$

where Q is the processed image data, S is the original image data, and $f(S-S_m)$ is a function of the difference between the original image data S and the average $S_m$, and has the following characteristic in at least one of the following first and second ranges of the difference between the original image data S and the average $S_m$. The difference between the original image data S and the average $S_m$ is positive in the first range and negative in the second range, and according to the above characteristic, the absolute value $|Q-S|$ of the difference between the processed image data Q and the original image data S varies in accordance with an increasing monotonic function of the absolute value $|S-S_m|$ of the difference between the original image data S and the average $S_m$ when the absolute value $|S-S_m|$ of the difference between the original image data S and the average $S_m$ is less than a predetermined value, and the absolute value $|Q-S|$ of the difference between the processed image data Q and the original image data S varies in accordance with a decreasing monotonic function of the absolute value $|S-S_m|$ of the difference between the original image data S and the average $S_m$ when the absolute value $|S-S_m|$ of the difference between the original image data S and the average $S_m$ is more than the predetermined value.

In the first embodiment of the present invention, the above function $f(S-S_m)$ may be a non-odd function of the difference $S-S_m$ between the original image data S and the average $S_m$.

The above absolute value $|f(S-S_m)|$ of the above function $f(S-S_m)$ may satisfy a relationship, $$|f(S-S_m)| > |f(S_m-S)|.$$

The above absolute value $|f(S-S_m)|$ of the above function $f(S-S_m)$ may satisfy a relationship, $$|f(S-S_m)| < |f(S_m-S)|.$$

In the first embodiment of the present invention, the above processed image data Q may be obtained by using an equation, $$Q = S \times \{F_1(P)/F_2(P)\}/\{F_2(1)/F_1(1)\} \quad (5)$$

where $P = S/S_m$, $F_2(P)$ is a function of second degree or higher, and $F_1(P)$ is a function of a degree lower than the degree of the function $F_2(P)$.

The above functions $F_1(P)$ and $F_2(P)$ may be respectively determined in accordance with equations, $$F_1(P) = A + B + C \quad (6)$$

$$F_2(P) = A \times P^2 + B \times P + C \quad (7)$$

where A, B, and C are each a constant, determined for a range wherein $P > 1$ and a range wherein $P < 1$, respectively.

According to the second aspect of the present invention, there is provided a method for processing a radiographic image, comprising, a step for calculating an average ($S_m$) of original image data of an averaging area around each pixel of the above radiographic image, and a step for transforming the original image data of each pixel of the above radiographic image to obtain a processed image data of each pixel in accordance with an equation, $$Q = S + f(S - S_m)$$

where Q is the processed image data, S is the original image data, and $f(S-S_m)$ is a non-odd function of the difference $S-S_m$ between the original image data S and the average $S_m$.

In the second embodiment of the present invention, the above absolute value $|f(S-S_m)|$ of the above function $f(S-S_m)$ may satisfy a relationship, $$|f(S-S_m)| > |f(S_m-S)|.$$

In the second embodiment of the present invention, the above absolute value $|f(S-S_m)|$ of the above function $f(S-S_m)$ may satisfy a relationship, $$|f(S-S_m)| < |f(S_m-S)|.$$

DESCRIPTION OF THE PREFERRED EMBODIMENTS

Figure 1:
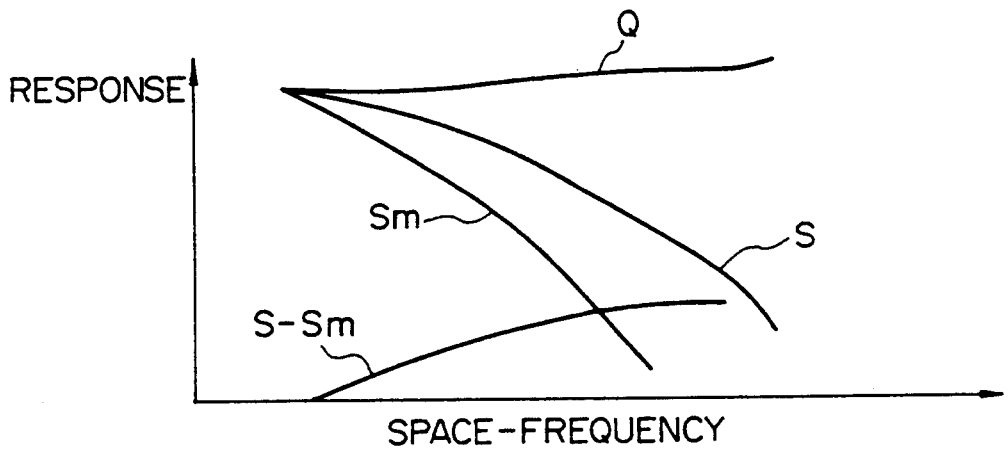
FIG. 1 is a diagram indicating space-frequency characteristics of an original image data S, an average $S_m$, a processed image data Q, and a difference between the original image data S and the average $S_m$.
Figure 2:
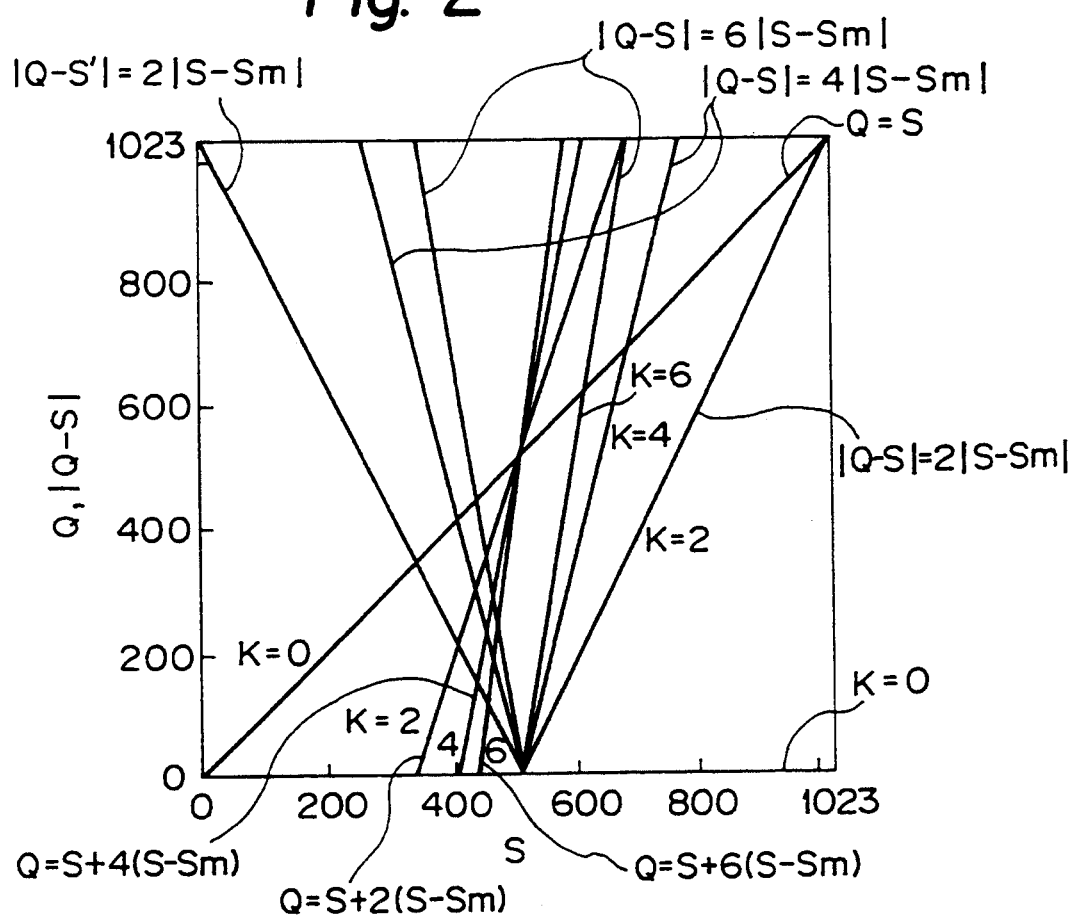
FIG. 2 is a diagram indicating a relationship between original pixel values S of the image data and processed pixel values Q of the processed image data, and a relationship between the original pixel values S of the image data and the degree of enhancement $|Q-S|$.
Figure 3:
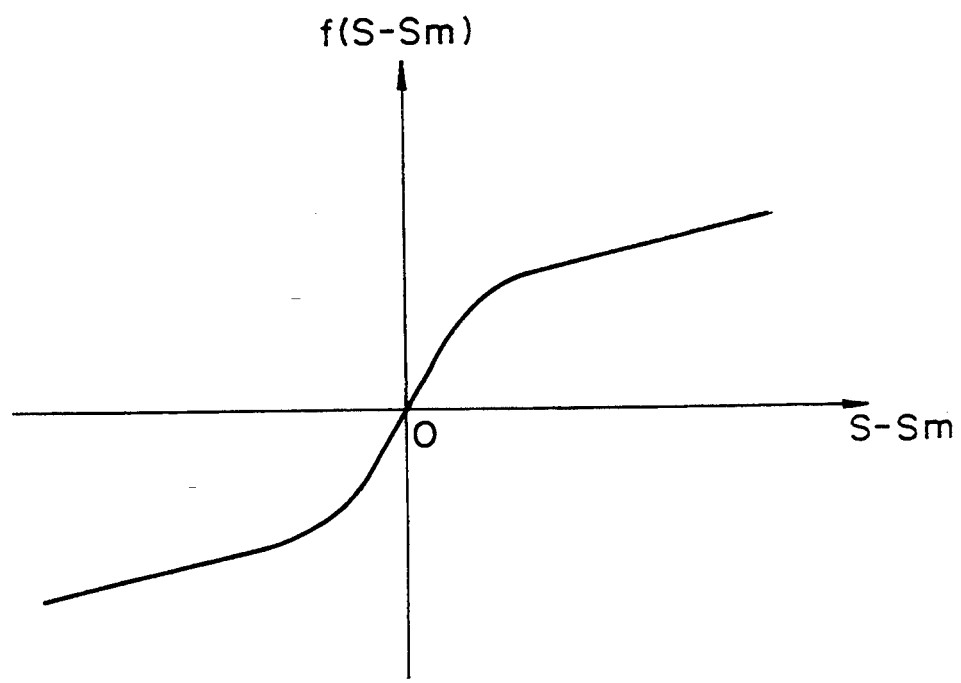
FIG. 3 is a diagram illustrating a typical odd increasing monotonic function of the difference between the original image data S and the average $S_m$ for used to enhance a high space-frequency component in original image data.
Figure 4:
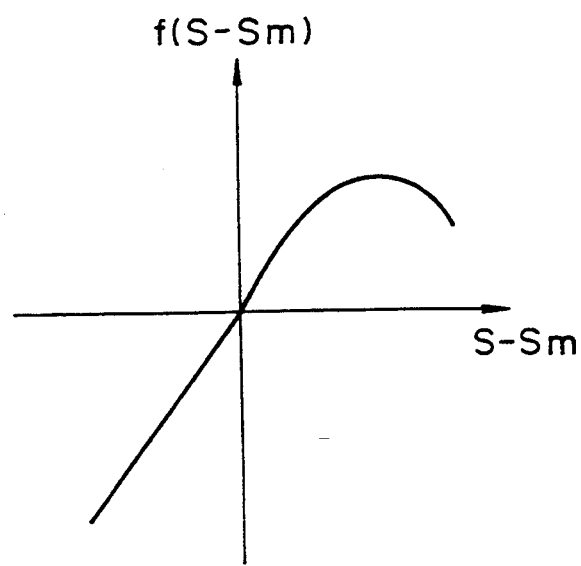
FIGS. 4 to 6 are diagrams illustrating an example function $f(S-S_m)$ in the equation (4) in accordance with the first aspect of the present invention.
Figure 5:
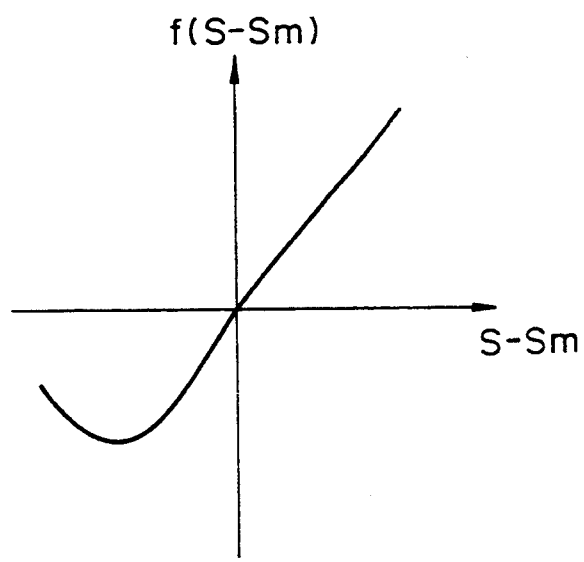
Figure 6:
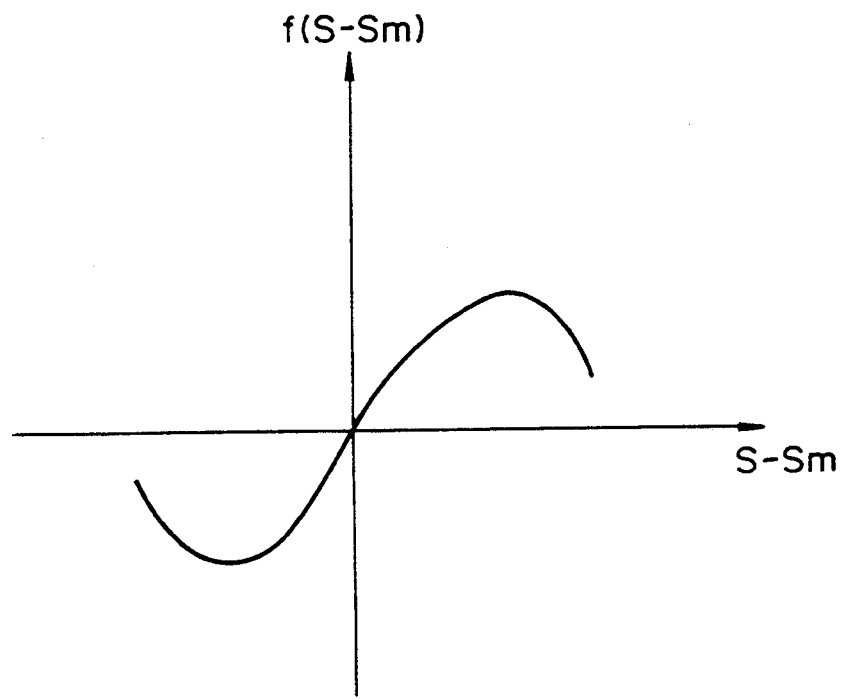
Figure 7:
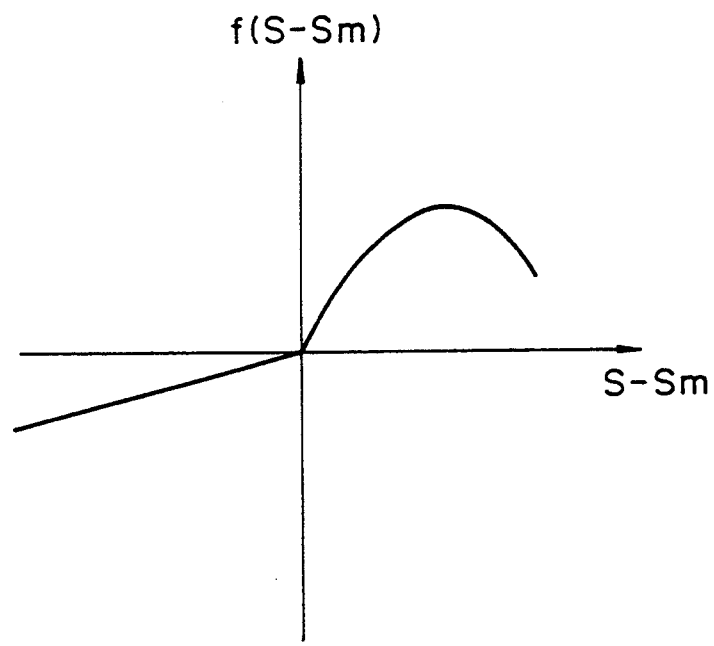
FIGS. 7 to 10 are diagrams illustrating an example function $f(S-S_m)$ in the equation (4) in accordance with the second aspect of the present invention.
Figure 8:
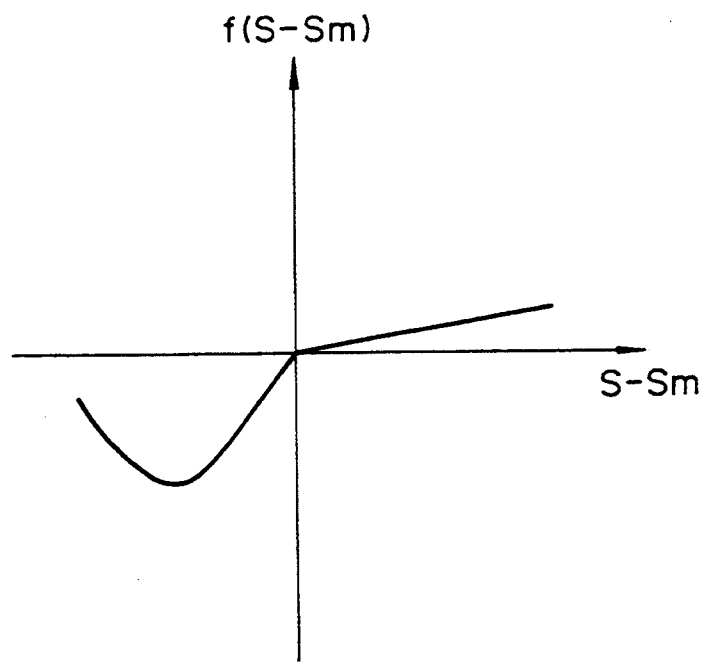
Figure 9:
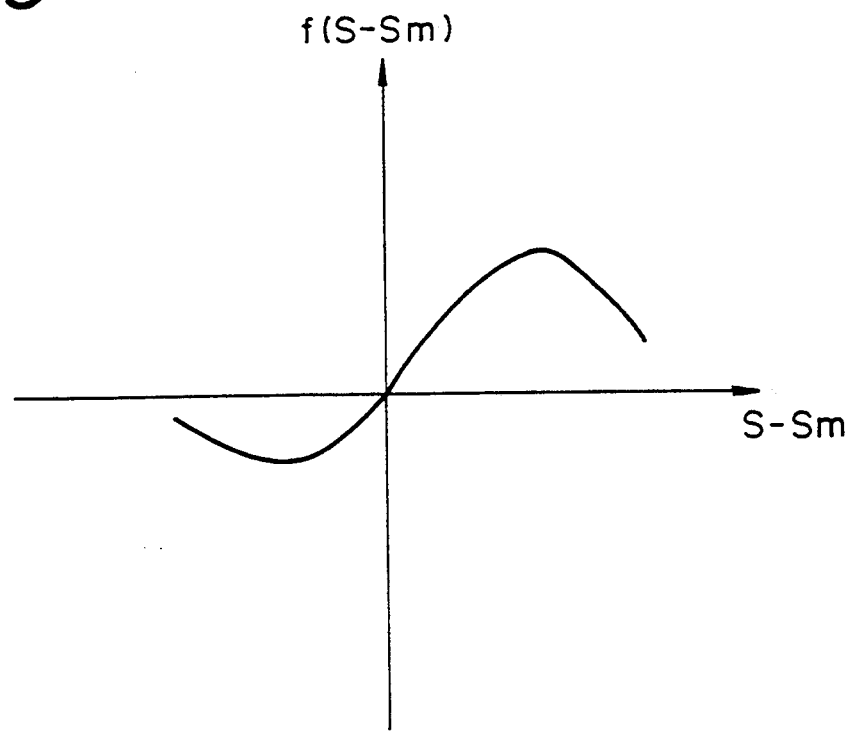
Figure 10:
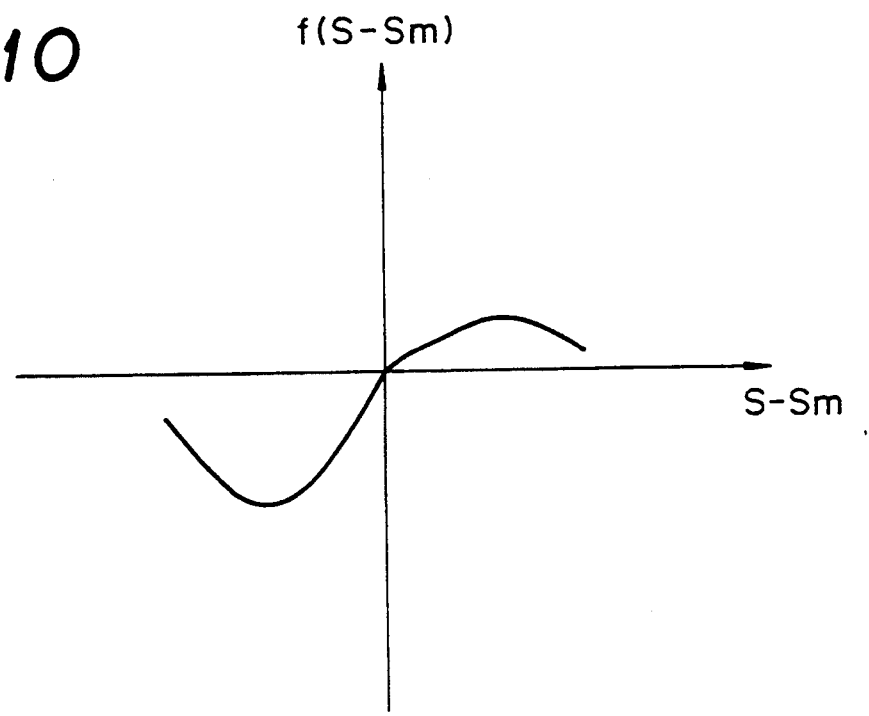

Basic Operations of the Present Invention (FIGS. 4, 5, and 6)

According to the first aspect of the present invention, the function $f(S-S_m)$ has the following characteristic in at least one of first and second ranges of the difference between the original image data S and the average $S_m$, where the difference between the original image data S and the average $S_m$ is positive in the first range and negative in the second range. According to the above characteristic, the absolute value $|Q-S|$ varies in accordance with an increasing monotonic function of the absolute value $|S-S_m|$ when the absolute value $|S-S_m|$ is less than a predetermined value, and the absolute value $|Q-S|$ varies in accordance with a decreasing monotonic function of the absolute value $|S-S_m|$ when the absolute value $|S-S_m|$ is more than the predetermined value. Therefore, an originally small variation of density (i.e., when the absolute value $|S-S_m|$ is less than the predetermined value) is emphasized by the enhancement of the high space-frequency component of the original image data in accordance with the increasing monotonic function of the absolute value $|S-S_m|$, but an originally large variation of density (i.e., when the absolute value $|S-S_m|$ is more than the predetermined value) is not significantly emphasized because the enhancement of the high space-frequency component of the original image data is suppressed in accordance with the decreasing monotonic function of the absolute value $|S-S_m|$.

FIGS. 4, 5, and 6 are diagrams illustrating an example function $f(S-S_m)$ in the equation (4). In FIG. 4, the above absolute value $|Q-S|$ varies in accordance with an increasing monotonic function of the absolute value $|S-S_m|$ when the absolute value $|S-S_m|$ is less than the predetermined value, and the absolute value $|Q-S|$ varies in accordance with a decreasing monotonic function of the absolute value $|S-S_m|$ when the absolute value $|S-S_m|$ is more than the predetermined value, in the above first case wherein the difference $S-S_m$ is positive. In FIG. 5, the above absolute value $|Q-S|$ varies in accordance with an increasing monotonic function of the absolute value $|S-S_m|$ when the absolute value $|S-S_m|$ is less than the predetermined value, and the absolute value $|Q-S|$ varies in accordance with a decreasing monotonic function of the absolute value $|S-S_m|$ when the absolute value $|S-S_m|$ is more than the predetermined value, in the above second case wherein the difference $S-S_m$ is negative.

According to the second aspect of the present invention, the original image data S of each pixel of the above radiographic image is transformed to a processed image data Q in accordance with an equation, $$Q = S + f(S-S_m)$$

where $f(S-S_m)$ is a function $f(S-S_m)$ is a non-odd function of the difference $S-S_m$ between the original image data S and the average $S_m$. The above absolute value $|f(S-S_m)|$ of the above function $f(S-S_m)$ may satisfy a relationship, $$|f(S-S_m)| > |f(S_m-S)| \text{ or}$$
$$|f(S-S_m)| < |f(S_m-S)|,$$

as indicated in FIGS. 7 to 10, respectively.

When a radiographic image, wherein high density portions correspond to portions of an object through which relatively large amounts of X-rays are transmitted, is processed in accordance with the equation (4) wherein the function $f(S-S_m)$ satisfies the relationship $|f(S-S_m)| > |f(S_m-S)|$, a portion of the radiographic image, wherein the density is relatively small compared with the density of portions around the above portion, is made clearer to be discriminated by a doctor. For example, when a lung tumor is located in a lungfield, the density of an image of the lung tumor is relatively small compared with density of the lungfield around the lung tumor, and therefore, the image of the lung tumor and capillary vessels near the lung tumor becomes clearer because high space-frequency components of the image of the lungfield around the lung tumor is enhanced. Similarly, a small variation of density due to disease in spaces between bodies of vertebra also becomes clearer.

When a luminance-inverted radiographic image, wherein high density portions correspond to portions of an object through which relatively small amounts of X-rays are transmitted, is processed in accordance with the equation (4) wherein the function $f(S-S_m)$ satisfies the relationship $|f(S-S_m)| < |f(S_m-S)|$, a portion of the radiographic image, wherein the density is relatively large compared with the density of portions around the above portion, is made clearer to be discriminated by a doctor. For example, when an image of a lung tumor is in a lungfield overlaps with an image of the heart or the diaphragm, or when a tumor is in the bronchus, the density of the image of the tumor is relatively large compared with density around the tumor, and therefore, the image of the tumor becomes clearer because high space-frequency components of the image of the tumor is enhanced.

Processing of Image Data (FIGS. 11 to 15)

As mentioned in SUMMARY OF THE INVENTION, processed image data Q of each pixel is obtained from original image data of the pixel in accordance with the equation, $$Q = S \times \{F_1(P)/F_2(P)\}/\{F_2(1)/F_1(1)\} \tag{5}$$

where $P=S/S_m$, $F_2(P)$ is a function of second degree or higher, and $F_1(P)$ is a function of a degree lower than the degree of the function $F_2(P)$. Preferably, the above functions $F_1(P)$ and $F_2(P)$ are respectively determined in accordance with equations, $$F_1(P)=A+B+C \qquad (6)$$

$$F_2(P)=A\times P^2+B\times P+C \qquad (7)$$

where A, B, and C are each a constant, determined for a range wherein $P>1$ and a range wherein $P<1$, respectively.

Figure 11:
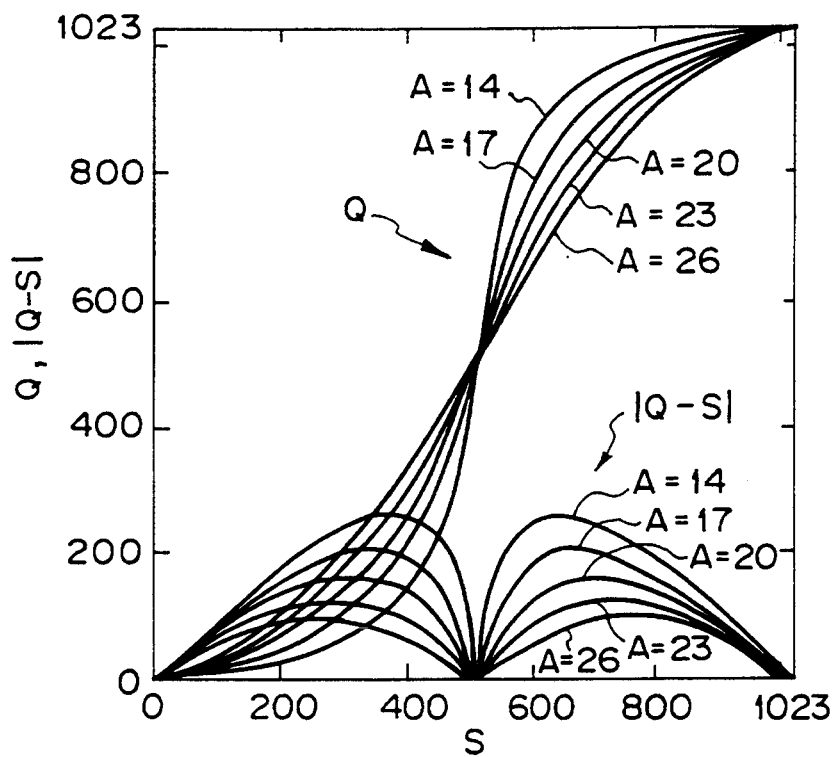
FIGS. 11 to 15 are diagrams indicating pixel values of processed image data Q and the degree of enhancement $|Q-S|$ for pixel values S of original image data 0 to 1023, in accordance with the equations (5) to (7)

FIG. 11 is a diagram indicating pixel values of processed image data Q and the degree of enhancement $|Q-S|$ for pixel values S of original image data 0 to 1023, in accordance with the equations (5) to (7), where the average $S_m=511$, A=14 to 26, B=−60, and C=50. In FIG. 11, the calculation of the pixel values of the processed image data Q is carried out in accordance with the above conditions for the original pixel values $S<S_m$. The calculation of the equations (5) to (7) is carried out for $S'=1023-S$, and the calculated results are inverted to obtain the pixel values of the processed image data Q for the original pixel values $S>S_m$. As indicated in FIG. 11, the absolute value $|Q-S|$ varies in accordance with an increasing monotonic function of the absolute value $|S-S_m|$ when the absolute value $|S-S_m|$ is less than a predetermined value, and the absolute value $|Q-S|$ varies in accordance with a decreasing monotonic function of the absolute value $|S-S_m|$ when the absolute value $|S_m|$ is more than the predetermined value. The degree of enhancement $|Q-S|$ can be varied by adaptively varying the value of the constant A according to respective regions in the radiographic image. Further, for example, A=14 for $S>S_m$ and A=26 for $S<S_m$ can be used to make the degree of enhancement $|Q-S|$ for $S<S_m$ larger than the degree of enhancement $|Q-S|$ for $S>S_m$. Contrary to the above, the degree of enhancement $|Q-S|$ for $S<S_m$ can be made smaller than the degree of enhancement $|Q-S|$ for $S>S_m$ by selecting a large A value for $S>S_m$ and a small A value for $S<S_m$.

Figure 12:
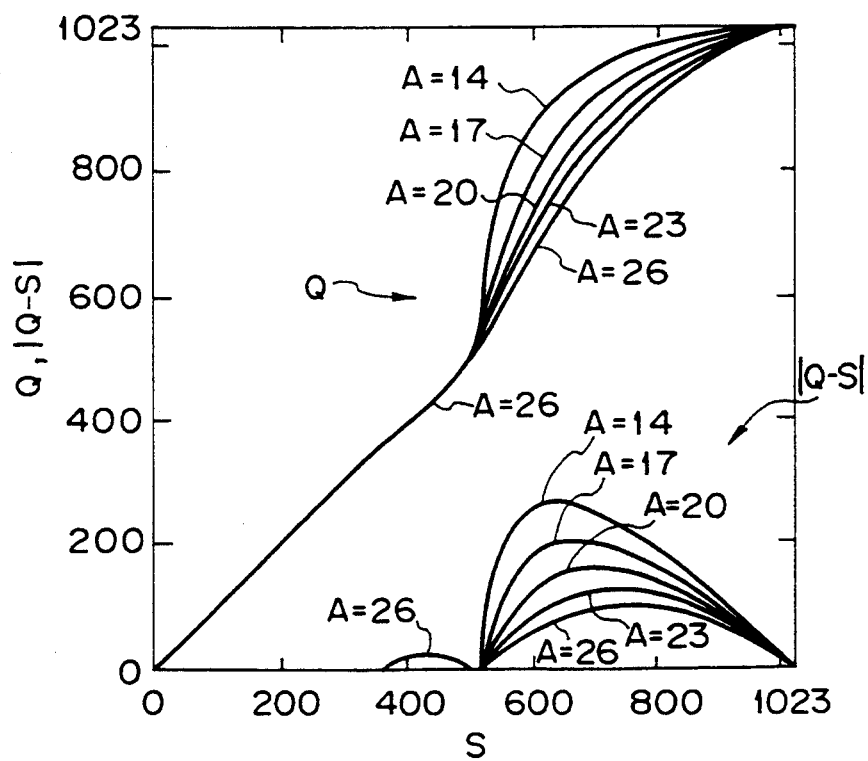

FIG. 12 is a diagram indicating pixel values of processed image data Q and the degree of enhancement $|Q-S|$ for pixel values S of original image data 0 to 1023, in accordance with the equations (5) to (7), where the average $S_m=511$, A=14 to 26, B=−60, and C=50. In FIG. 12, the calculation of the pixel values of the processed image data Q is carried out in the same manner as FIG. 11, except that the processed pixel values Q are respectively made equal to corresponding original pixel values S for the original pixel values $S<S_m$. In addition, the processed pixel values Q are respectively made equal to corresponding original pixel values S when a processed pixel value Q calculated by the equations (5) to (7) for $S>S_m$ is smaller than the corresponding original pixel value S and when a processed pixel value Q calculated by the equations (5) to (7) for $S<S_m$ is larger than the corresponding original pixel value S.

Figure 13:
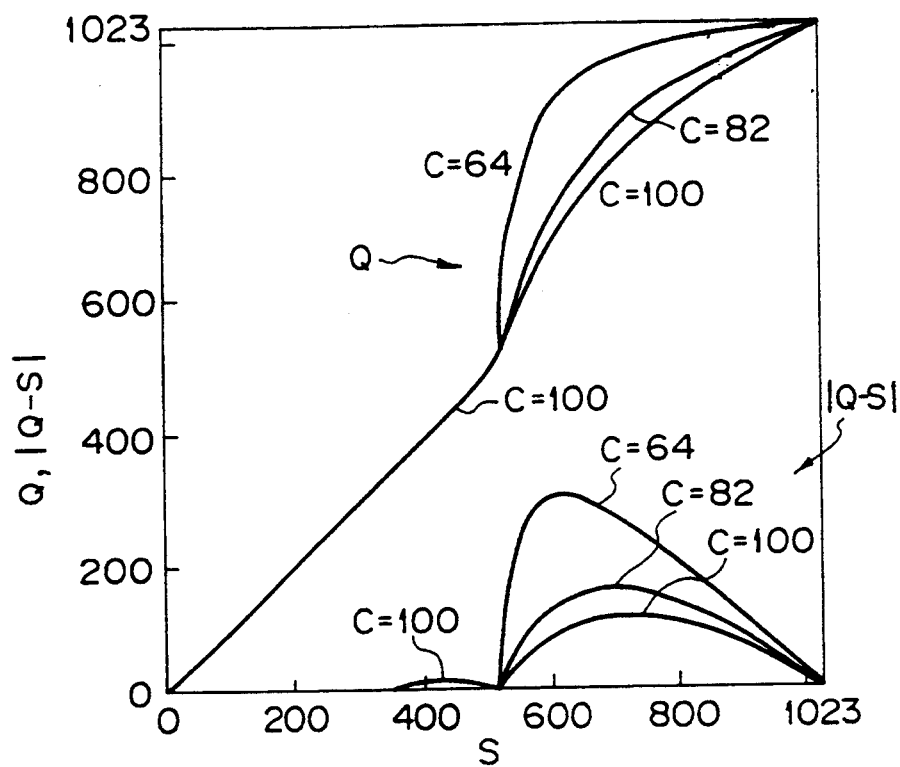

FIG. 13 is a diagram indicating pixel values of processed image data Q and the degree of enhancement $|Q-S|$ for pixel values S of original image data 0 to 1023, in accordance with the equations (5) to (7), where the average $S_m=511$, A=14 to 26, B=−60, and C=65 to 100 for $S>S_m$ and C=100 for $S<S_m$. As indicated in FIG. 12, the relationship between the original image data S and the processed image data Q can be adaptively varied by varying the constant C in response to various delicate requests by a doctor.

Figure 14:
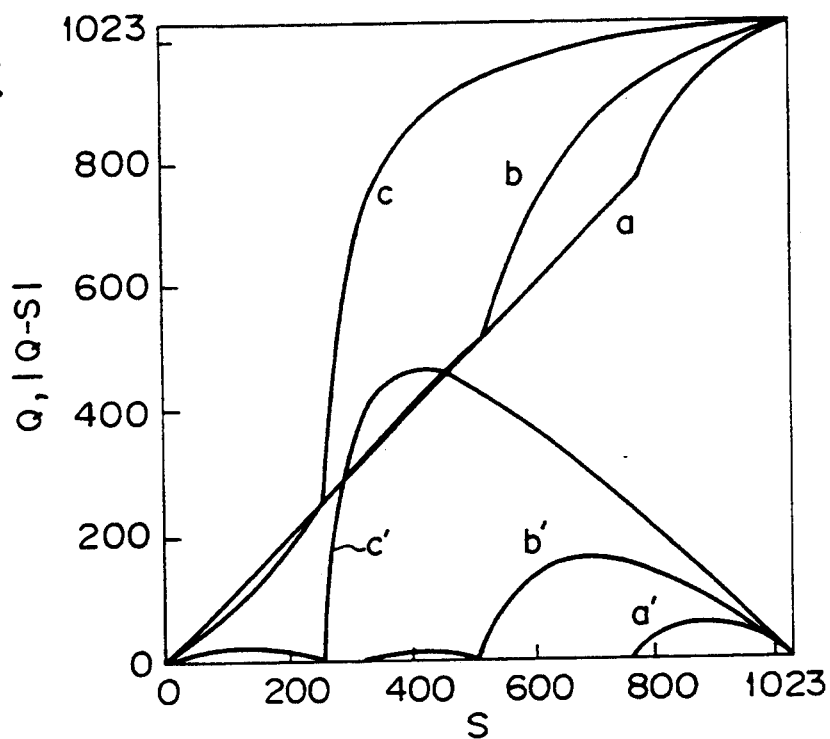

FIG. 14 is a diagram indicating pixel values of processed image data Q and the degree of enhancement $|Q-S|$ for pixel values S of original image data 0 to 1023, in accordance with the equations (5) to (7), where A=16 for $S>S_m$ and A=26 for $S<S_m$ to 26, and B=−60. The curves a and a' respectively indicate pixel values Q of processed image data and values $|Q-S|$ of the degree of enhancement obtained for the average $S_m=767$ and C=100. The above parameters for generating the curves a and a' are applicable to lungfields in radiographic images of the chest. The curves b and b' respectively indicate pixel values Q of processed image data and values $|Q-S|$ of the degree of enhancement obtained for the average $S_m=511$ and C=72. The above parameters for generating the curves b and b' are applicable to portions of the heart in radiographic images of the chest. The curves c and c' respectively indicate pixel values Q of processed image data and values $|Q-S|$ of the degree of enhancement obtained for the average $S_m=255$ and C=64. The above parameters for generating the curves c and c' are applicable to portions of bodies of vertebra in radiographic images of the chest.

Figure 15:
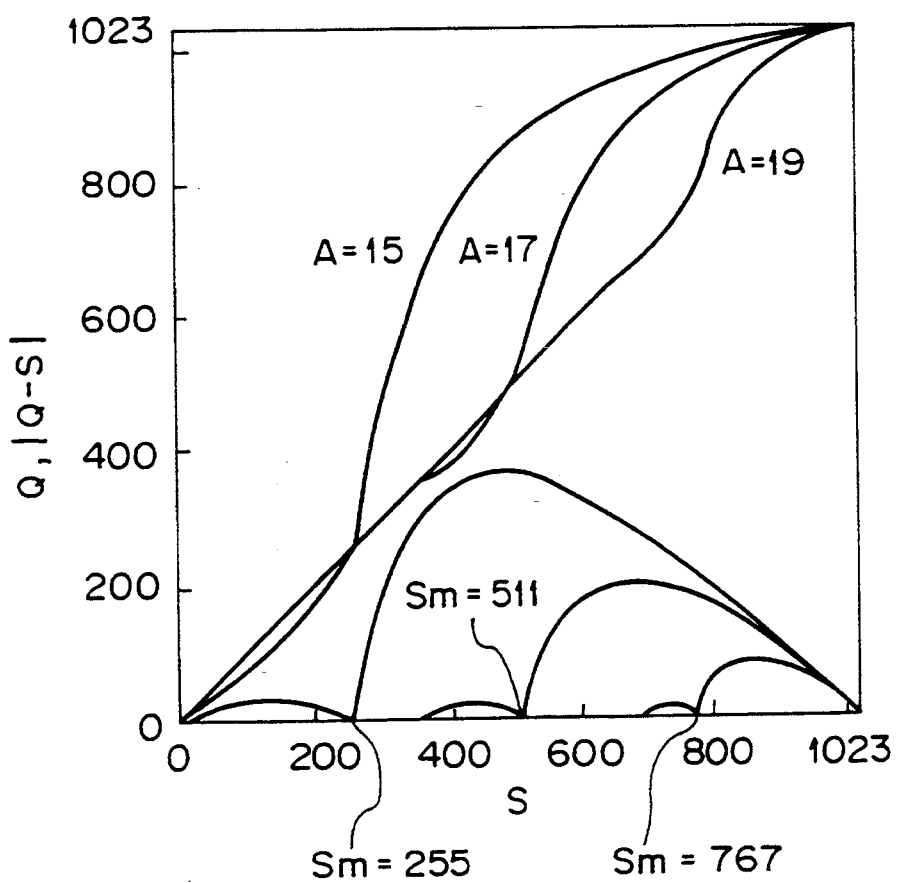

FIG. 15 is a diagram indicating pixel values of processed image data Q and the degree of enhancement $|Q-S|$ for pixel values S of original image data 0 to 1023, in accordance with the equations (5) to (7), where B=−50, C=50, the value of the average $S_m$ is varied as 767, 511, and 255, and correspondingly the value of A is 19, 17, and 15 for $S>S_m$. As indicated in FIG. 15, values similar to the curves of FIG. 14 can be obtained by varying the constant A.

The above processed pixel values Q can be obtained either by calculating the equations (5) to (7) or by reading from a look-up table wherein the processed pixel values Q for all the original pixel values S, and various parameters $S_m$, A, B, and C, which are calculated in accordance with the equations (5) to (7) in advance, are stored.

It is desirable to indicate the above curves for the pixel values Q of the processed image data and the values of the $|Q-S|$ of the degree of enhancement on a display device when setting the above parameters A, B, and C. The curves may be determined by simply inputting the parameters A, B, and C, or by displaying a typical standard curve on the display device, and then modifying the standard curve by a cursor operation. The processed pixel values Q on the curve determined as above may be stored in the look-up table.

As mentioned above, the degree of enhancement $|Q-S|$ may be set respectively for various anatomical portions of an object, for example, a lungfield, a mediastinum, a diaphragm, and a body of vertebra.

Determination of Anatomical Regions (FIGS. 16 to 22)

There are two ways to determine various anatomical portions of a human body. In one way, various anatomical portions are determined from a curve (pixel value curve) formed by original pixel values of image data on each line of a radiographic image, and in the other way, various anatomical portions are determined from a curve (histogram) formed by frequencies of all possible original pixel values of image data. The latter can be applied to radiographic images of the chest wherein the respective anatomical portions have discrete values of density.

A typical radiographic image has 256 to 1024 pixels in each of the horizontal and longitudinal directions, and image data of pixels has 256 to 1024 grades.

Figure 16:
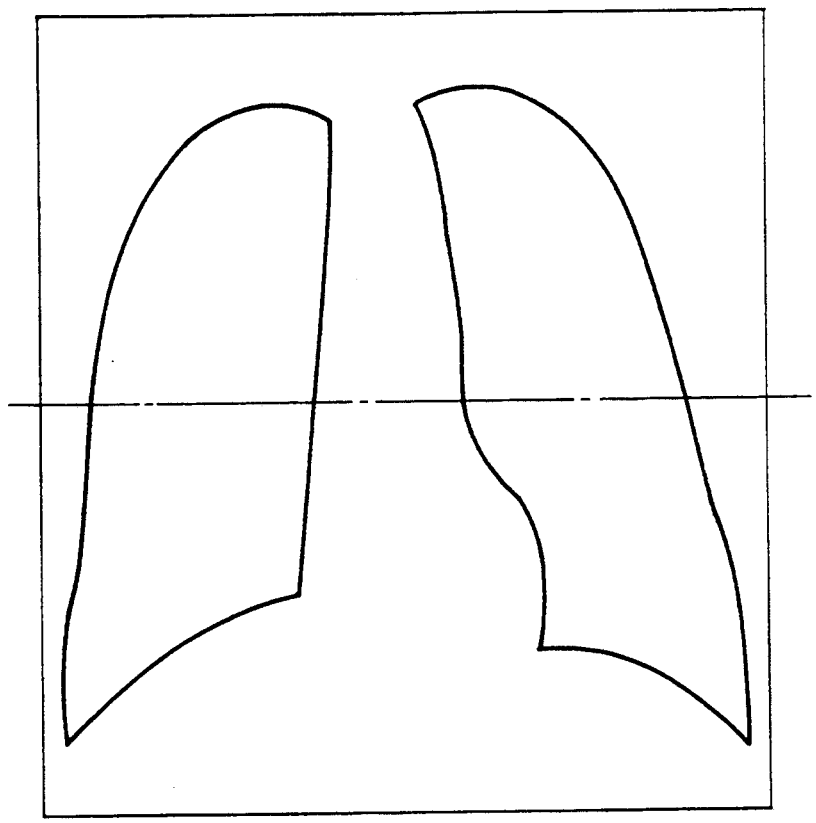
FIG. 16 is a diagram illustrating a radiographic image of the chest wherein boundaries of lungfields are indicated.
Figure 17:
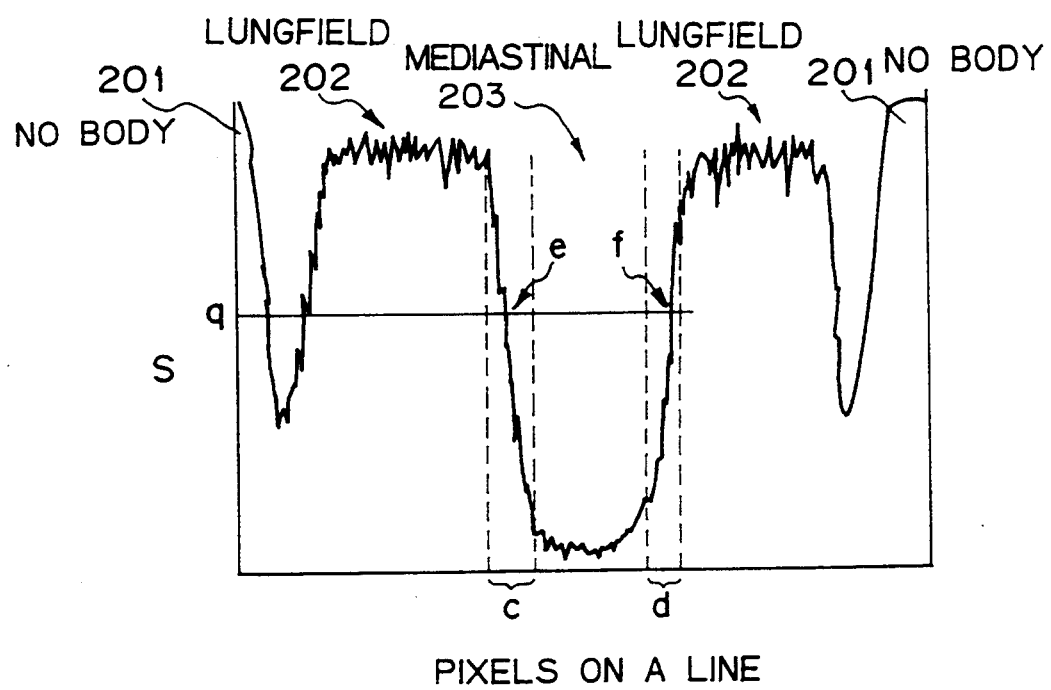
FIG. 17 is a diagram indicating a typical curve formed by original pixel values of image data on a line of a radiographic image of FIG. 16.

FIG. 16 is a diagram illustrating a radiographic image of the chest wherein boundaries of lungfields are indicated, and FIG. 17 is a diagram indicating a typical curve (pixel value curve) formed by original pixel values of image data on a line of a radiographic image of FIG. 16. The pixel value curve of the line in the radiographic image of the chest has the greatest original pixel values in portions 201 which correspond to a region of a radiograph exposed to X-rays which have not been transmitted through a human body. The original pixel value of pixels in a region of a radiograph exposed to X-rays which have been transmitted through the skin is slightly smaller than the above original pixel values not corresponding to the human body, and the original pixel values of pixels in a region of a radiograph exposed to X-rays which have been transmitted through a rib where the rib extends in the direction of X-rays, become further smaller. In the lungfield 202, the original pixel values become large, which are slightly smaller than the above original pixel values corresponding to no human body. The original pixel values of pixels in a region of a radiograph exposed to X-rays which have been transmitted through the mediastinum 203 is smallest. Thus, it is easily understood which portion of the human body each portion of the pixel value curve corresponds to. The boundaries of the respective portions of the pixel value curve are automatically detected by smoothing the original pixel value curve, and then obtaining a local minimum and a local maximum of the smoothed pixel value curve. This operation for obtaining the boundaries of the respective portions can be determined just after obtaining a radiographic image, or just before the above-mentioned space-frequency processing is carried out.

Figure 18:
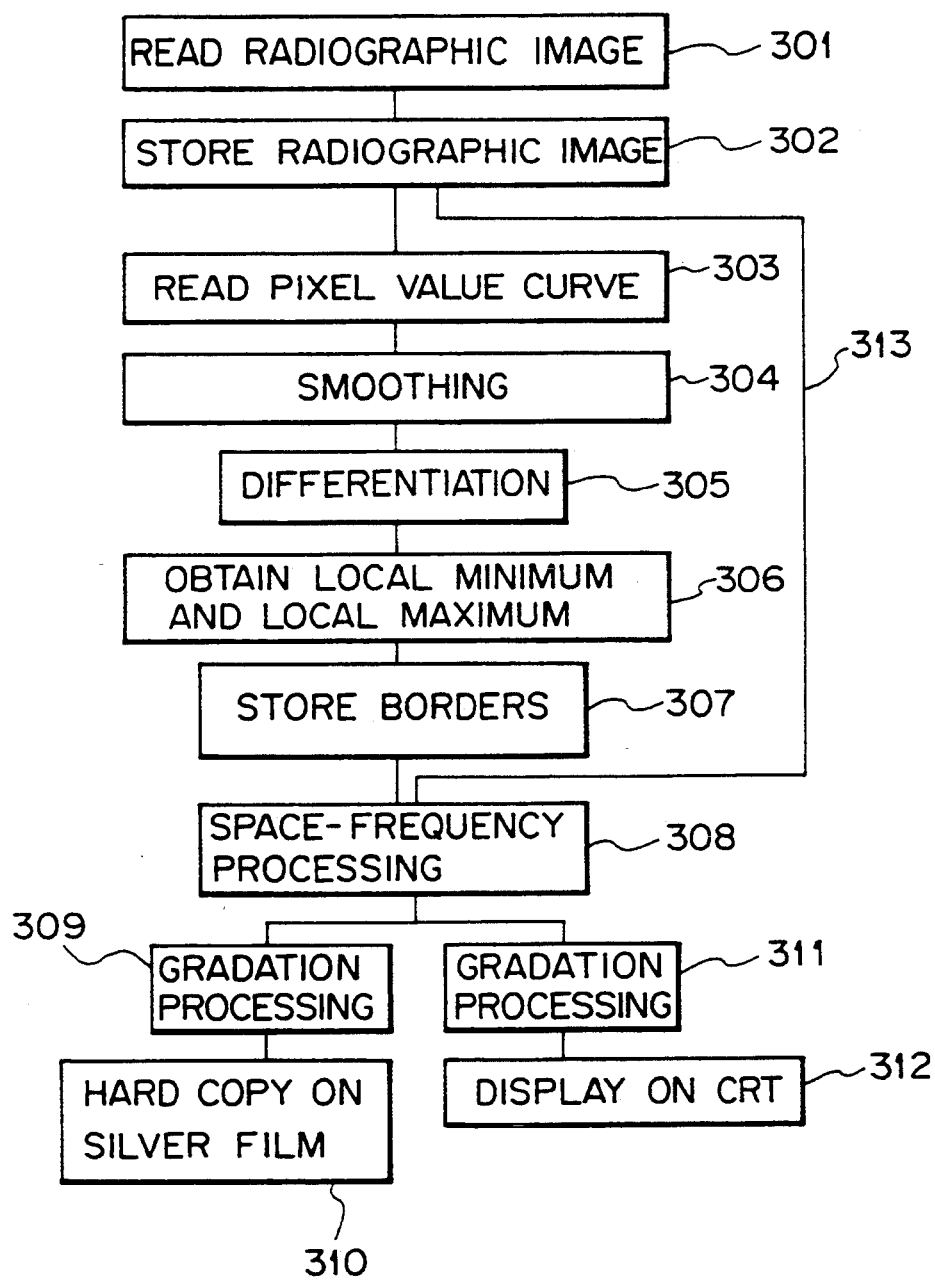
FIG. 18 is a flowchart of the operation of the embodiment of the present invention including the operation for obtaining the boundaries of the respective anatomical portions in a pixel value curve of each line of a radiographic image.

FIG. 18 is a flowchart of the operation of the embodiment of the present invention including the operation for obtaining the boundaries of the respective anatomical portions in a pixel value curve of each line of a radiographic image.

Figure 19:
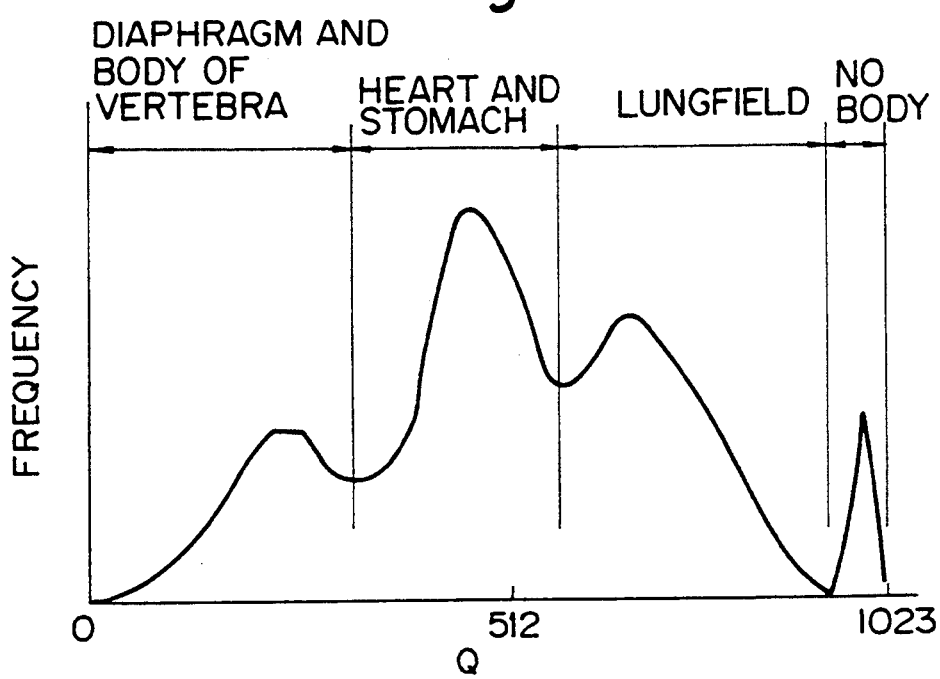
FIG. 19 is a diagram indicating a smoothed pixel value curve of each line of a radiographic image.

In step 301 of FIG. 18, a radiographic image is read from a silver film or an accelerated phosphorescent plate, and is then stored in a memory in step 302. In step 303, image data of each line of the radiographic image is read from the memory, and smoothing of the image data of each line is carried out by a moving average operation in step 304. In step 305, the smoothed image data of each line (as indicated in FIG. 19) is differentiated, then one or more local minimum and one or more local maximum are obtained from the differentiated image data in step 306. The obtained local minimum and local maximum are stored in a memory as boundaries of the anatomical regions of the human body. In step 308, the space-frequency processing according to the present invention is carried out for the respective anatomical regions. In steps 309 and 311, gradation processing is carried out according to whether the processed image is copied on a silver film (step 310) or displayed on a display device (step 312). In FIG. 18, the jump 313 from step 302 to step 308 corresponds to an operation wherein the above determination of the boundaries of the respective anatomical portions is not carried out.

The second way for determining the respective anatomical portions of the human body is explained below.

Figure 20:
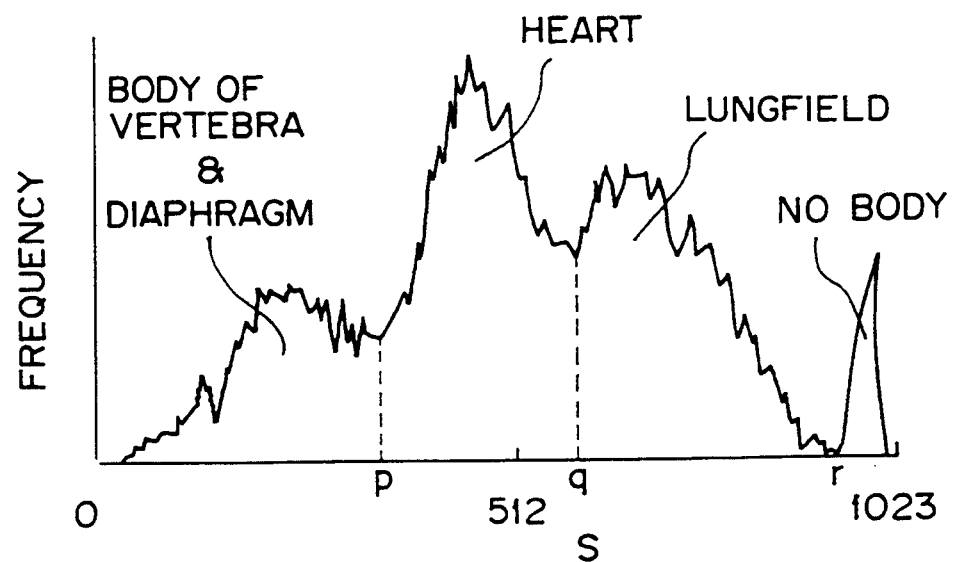
FIG. 20 is a diagram indicating an example distribution of frequencies of the respective values of image data of a radiographic image of the chest.

FIG. 20 is a diagram indicating an example distribution of frequencies of the respective pixel values S of image data of a radiographic image of the chest. In FIG. 20, pixel values S of image data extend from 0 to 1023 channels. As mentioned before, the original pixel values of pixels in a radiograph exposed to X-rays which have not been transmitted through the human body, form a first group of pixels having the largest values; the original pixel values of pixels in the lungfield form a second group of pixels having the second largest values; the original pixel values of pixels in a radiograph exposed to X-rays which have been transmitted through the heart, form a third group of pixels having the third largest values; and the original pixel values of pixels in a radiograph exposed to X-rays which have been transmitted through the body of vertebra and the diaphragm form a fourth group of pixels having the smallest values. Corresponding to the above four groups, the distribution of FIG. 20 has four peaks. Therefore, pixels in the radiographic image can be sorted into the above four anatomical regions by dividing the distribution of FIG. 20 into four groups respectively containing the four peaks.

Figure 21:
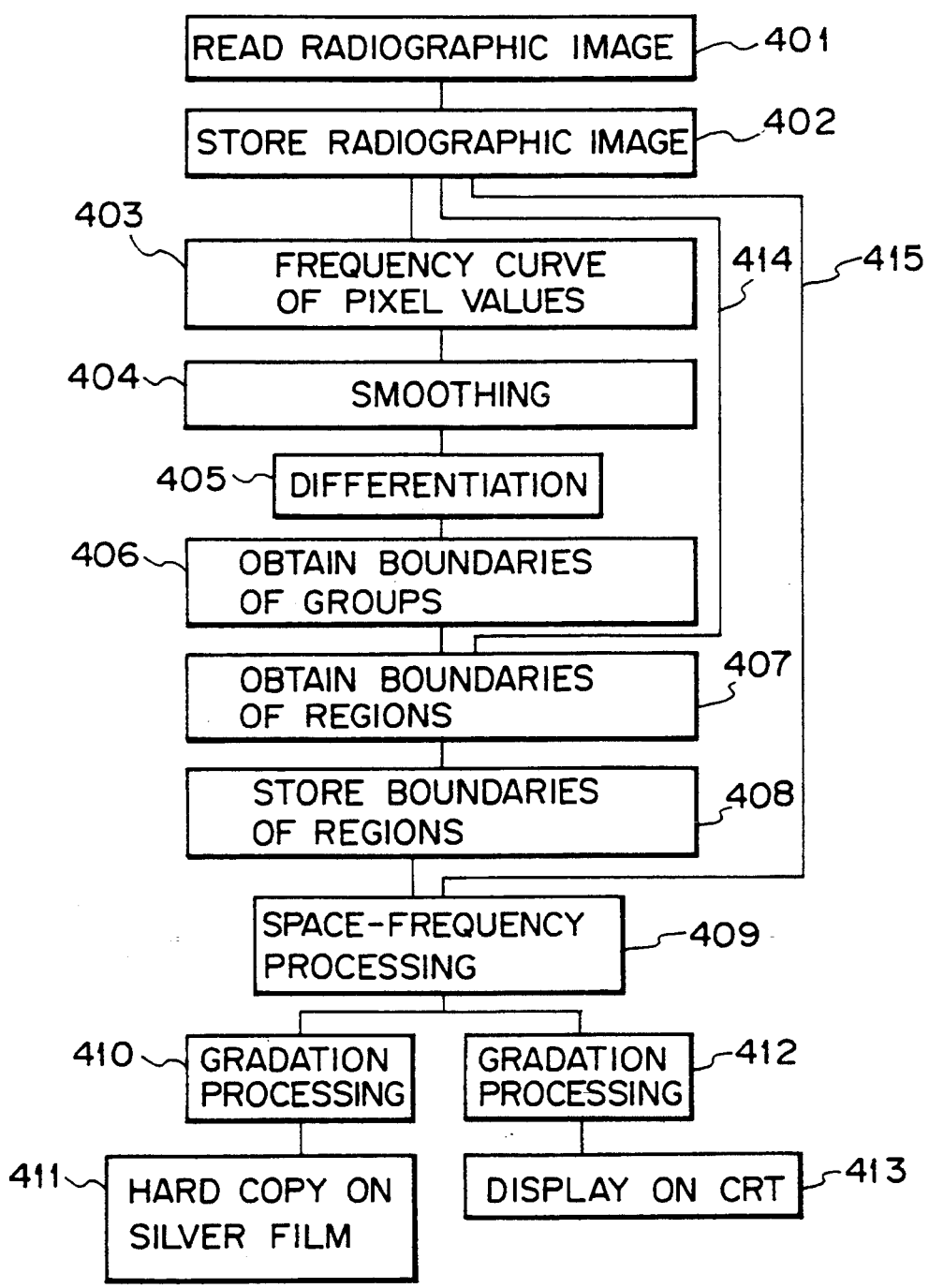
FIG. 21 is a flowchart of the operation of the embodiment of the present invention including the operation for obtaining the boundaries of peaks, corresponding to the respective anatomical portions, in the distribution of frequencies of original pixel values of a radiographic image.

FIG. 21 is a flowchart of the operation of the embodiment of the present invention including the operation for obtaining the boundaries of peaks, corresponding to the respective anatomical portions, in the distribution of frequencies of the original pixel values of a radiographic image. In step 401, a radiographic image is read from a silver film or an accelerated phosphorescent plate, and is then stored in a memory in step 402. In step 403, image data of the radiographic image is read from the memory, and the distribution of frequencies of the original pixel values of the radiographic image is generated. In step 404, smoothing of the above distribution is carried out by a moving average operation. In step 405, the smoothed image data of the distribution is differentiated, then one or more local minimum and one or more local maximum are obtained from the differentiated distribution as boundaries of the above four groups of original pixel values in step 406. The obtained boundaries in the distribution are used for determining boundaries of the anatomical regions of the human body in each line of a radiographic image in step 407. In step 407, each line of a radiographic image data is read from the memory, ranges in which boundaries of the respective anatomical portions will be located are predetermined in each line, and a pixel having the same pixel value as a corresponding one of the above boundaries of the groups of the original pixel values, is searched in the respective ranges in the line. For example, when determining boundaries between the lungfield and the mediastinum in the pixel value curve of FIG. 17, ranges "c" and "d" are determined as ranges in which the above boundaries between the lungfield and the mediastinum are located, and pixels "e" and "f" in the ranges "c" and "d", having the same pixel value "q" as a boundary between the peak corresponding to the heart and the peak corresponding to the lungfield in FIG. 20, are determined as the above boundaries between the lungfield and the mediastinum in the pixel value curve of the line. In step 408, the boundaries determined in step 407 are stored in a memory. In step 409, the space-frequency processing according to the present invention is carried out for the respective anatomical regions. In steps 410 and 412, gradation processing is carried out according to whether the processed image is copied on a silver film (step 411) or displayed on a display device (step 413). In FIG. 21, the jump 414 from step 402 to step 407 corresponds to an operation of FIG. 18, and the jump 415 from step 402 to step 409 corresponds to an operation wherein the above determination of the boundaries of the respective anatomical portions is not carried out.

Figure 22:
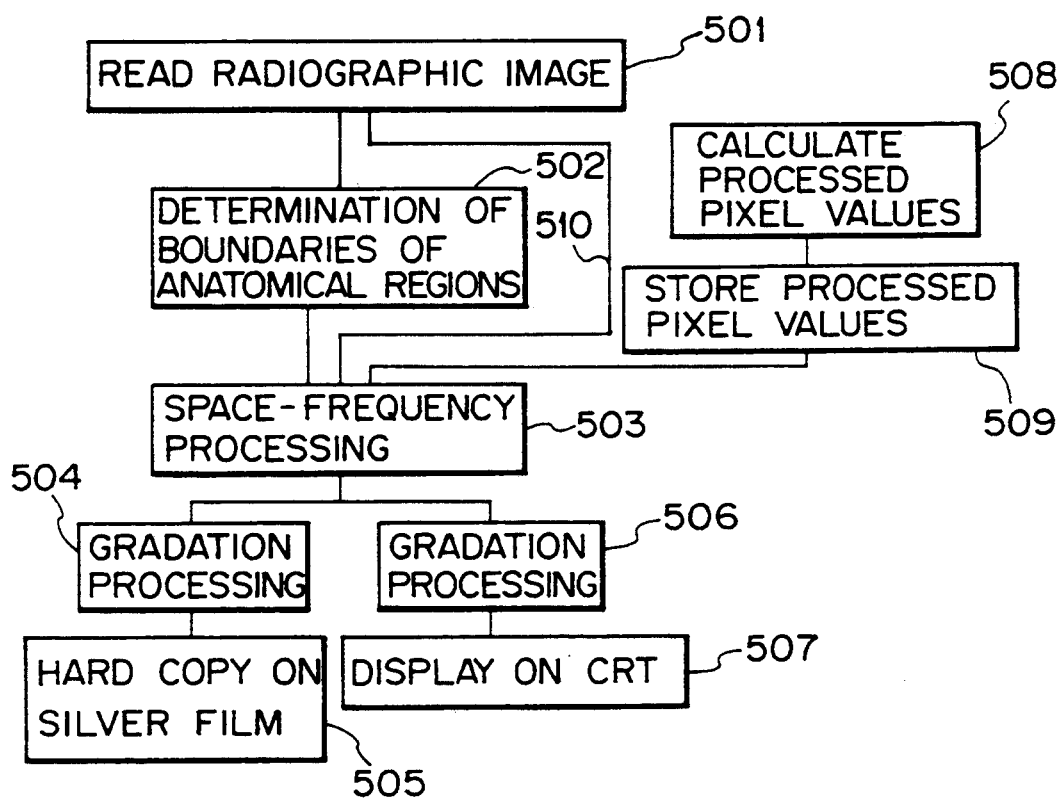
FIG. 22 is a flowchart of the operation of the embodiment of the present invention using a look-up table.

FIG. 22 is a flowchart of the operation of the embodiment of the present invention using a look-up table. In FIG. 22, the operations of steps 501 to 507, and 510 correspond to the above-mentioned operations of FIGS. 18 and 21, except that, processed pixel values Q read from a look-up table are used, based on the anatomical regions which each pixel belongs to, in the operation of the space-frequency processing in step 503. For the above purpose, the processed pixel values Q are calculated for the respective anatomical regions (step 508) and stored in a memory in advance (step 509).

Construction of Embodiment (FIGS. 23 to 27)

Figure 23:
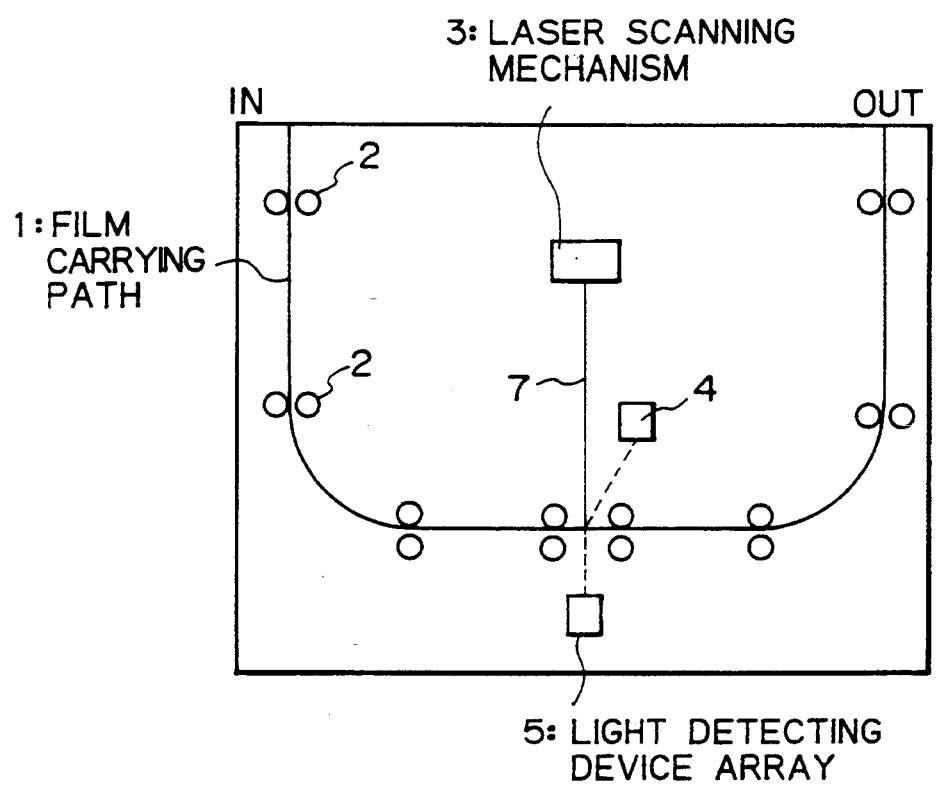
FIG. 23 is a diagram illustrating a construction of a film reader display device.

As mentioned before, the radiographic image stored on a silver film (or a photoprint) is photo-electrically read by a film reader device for electronically processing the radiographic image to improve the quality of the radiographic image. FIG. 23 is a diagram illustrating the construction of a film reader display device. In FIG. 23, reference numeral 1 denotes a path through which a silver film (or a photoprint) is transferred, 2 denotes a roller for transferring the silver film (or the photoprint), 3 denotes a laser scanning mechanism, 4 and 5 each denote a light detecting device array, and 7 denotes a path of a laser beam. A silver film (or a photoprint), on which a radiographic image is recorded, is transferred through the path 1 driven by the rollers 2. The laser beam scans the silver film (or the photoprint) in a direction perpendicular to the direction of the carriage of the silver film (or the photoprint). When a silver film is transferred through the path 1, the laser beam passes through the silver film, and the intensity of the laser beam passed through the silver film is detected by the light detecting device array 5. Or when a photoprint is transferred through the path 1, the laser beam is reflected by the photoprint, and the intensity of the laser beam reflected by the photoprint is detected by the light detecting device array 4. The above intensity of the laser beam detected by the light detecting device array 4 or 5 is supplied to a radiographic image processing apparatus according to the present invention.

Figure 24:
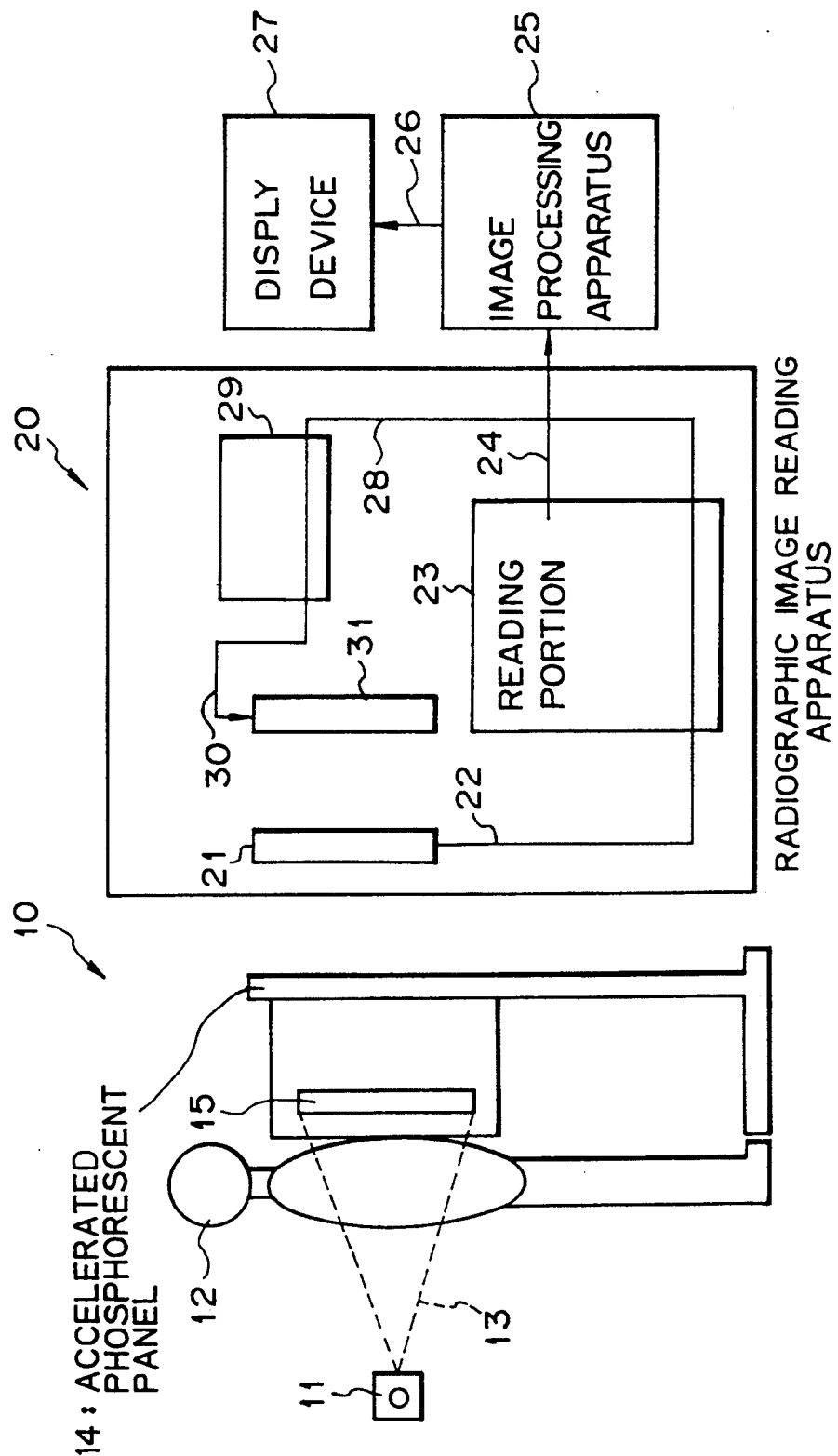
FIGS. 24 and 25 are diagrams illustrating a system for taking a radiograph and processing the radiographic image using the accelerated phosphorescent plate (panel)

FIG. 24 is a diagram illustrating a system for taking a radiograph and processing the radiographic image, using an accelerated phosphorescent plate (panel). In FIG. 24, reference numeral 11 is an X-ray generating apparatus; 12 denotes a human body; 13 denotes an X-ray; 14 denotes a stand for supporting the accelerated phosphorescent panel; 15 denotes the accelerated phosphorescent panel; 20 denotes a radiographic image reading apparatus; 21 denotes a panel inlet for inletting the accelerated phosphorescent panel into the radiographic image reading apparatus 20; 22 denotes a first panel transferring path through which the accelerated phosphorescent panel is transferred to a reading portion 23; 23 denotes the reading portion for reading a radiographic image from the accelerated phosphorescent panel which is supplied thereto through the first panel transferring path 22; 24 denotes a signal path for transmitting signals of the radiographic image read from the accelerated phosphorescent panel; 25 denotes an image processing apparatus for processing the radiographic image read from the accelerated phosphorescent panel according to the present invention; 27 denotes a display device for displaying the radiographic images before and after the processing, and the above-mentioned characteristics of the processing; 28 denotes a second panel transferring path for transferring the accelerated phosphorescent panel to a panel erasing portion 29; 29 denotes the panel erasing portion for erasing the radiographic image recorded in the accelerated phosphorescent panel; 30 denotes a third panel transferring path for transferring the accelerated phosphorescent panel to a panel outlet portion 31; 31 denotes the panel outlet portion from which the accelerated phosphorescent panel is outlet from the radiographic image reading apparatus 20.

The X-rays 13 generated by the X-ray generating apparatus 11 are transmitted through the human body 12, and are applied to the accelerated phosphorescent panel 15. Thus, a radiographic image is recorded in the accelerated phosphorescent panel 15 according to the intensities of the X-rays transmitted through the human body 12 and applied to the accelerated phosphorescent panel. The accelerated phosphorescent panel 15 is inlet into the radiographic image reading apparatus 20 from the panel inlet 21. The accelerated phosphorescent panel may be contained in a magazine or a cassette. In this case, the accelerated phosphorescent panel is taken out from the magazine or a cassette, and then the accelerated phosphorescent panel 15 is transferred through the path 22 to the reading portion. The radiographic image recorded in the accelerated phosphorescent panel 15 is read therefrom and transmitted through the signal path 24 to the image processing apparatus 25. The radiographic image is processed in the image processing apparatus 25, and the processed radiographic image is displayed in the display device 27, or may be recorded on a silver film by a laser printer (not shown). The accelerated phosphorescent panel 15 from which the radiographic image is read out is transferred through the path 28 to the panel erasing portion 29 in which the radiographic image recorded in the accelerated phosphorescent panel 15 is erased by an erasing beam. The accelerated phosphorescent panel 15 is transferred to the panel outlet 31 after the radiographic image is erased.

Figure 25:
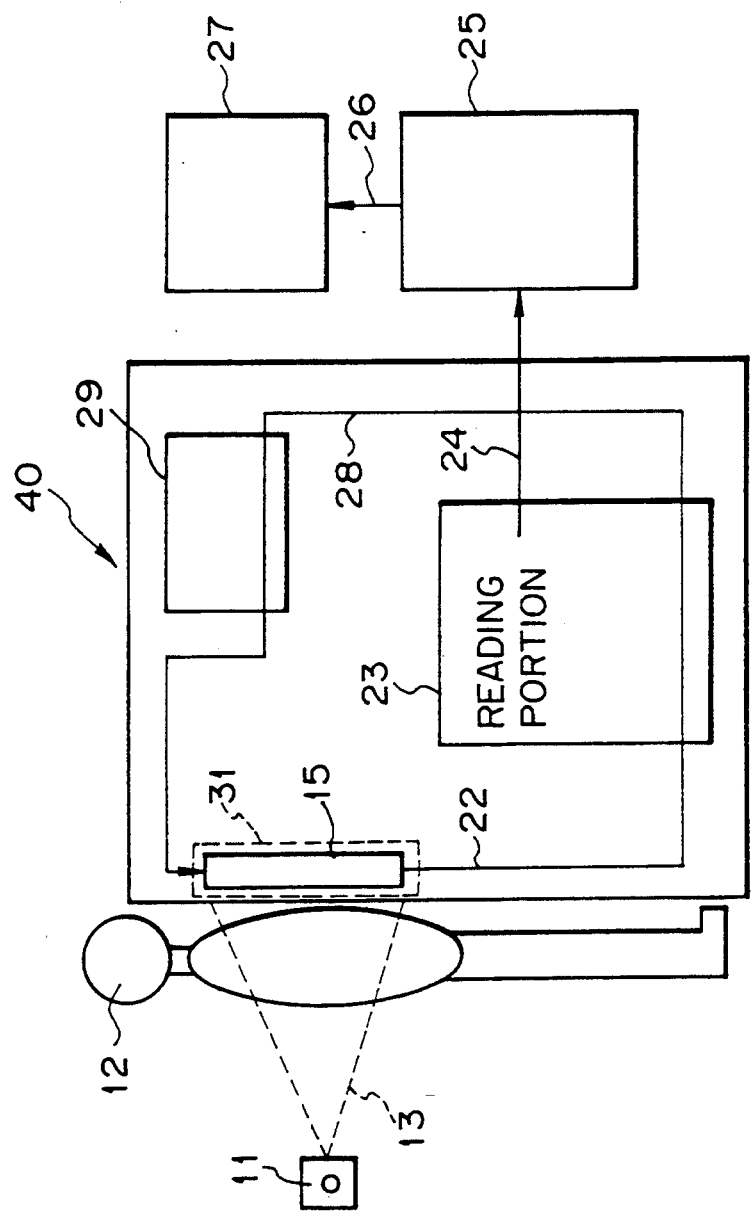

FIG. 25 is a diagram illustrating another system for taking a radiograph and processing the radiographic image using an accelerated phosphorescent plate (panel). In the construction of FIG. 25, the same reference numerals as FIG. 24 respectively operate the same as in the corresponding elements in FIG. 24. In the construction of FIG. 25, reference numeral 40 denotes a radiographing apparatus. The accelerated phosphorescent panel 15 is supported in a panel holding portion 31 within the radiographing apparatus 40 while taking a radiograph to record the radiographic image in the accelerated phosphorescent panel 15. After the radiographic image is recorded in the accelerated phosphorescent panel 15, the accelerated phosphorescent panel 15 is transferred in the same path as FIG. 24 in the radiographing apparatus 40. After the radiographic image in the accelerated phosphorescent panel 15 is erased in the panel erasing portion 29, the accelerated phosphorescent panel 15 is automatically re-set in the panel holding portion 31 for taking the next radiograph.

Figure 26:
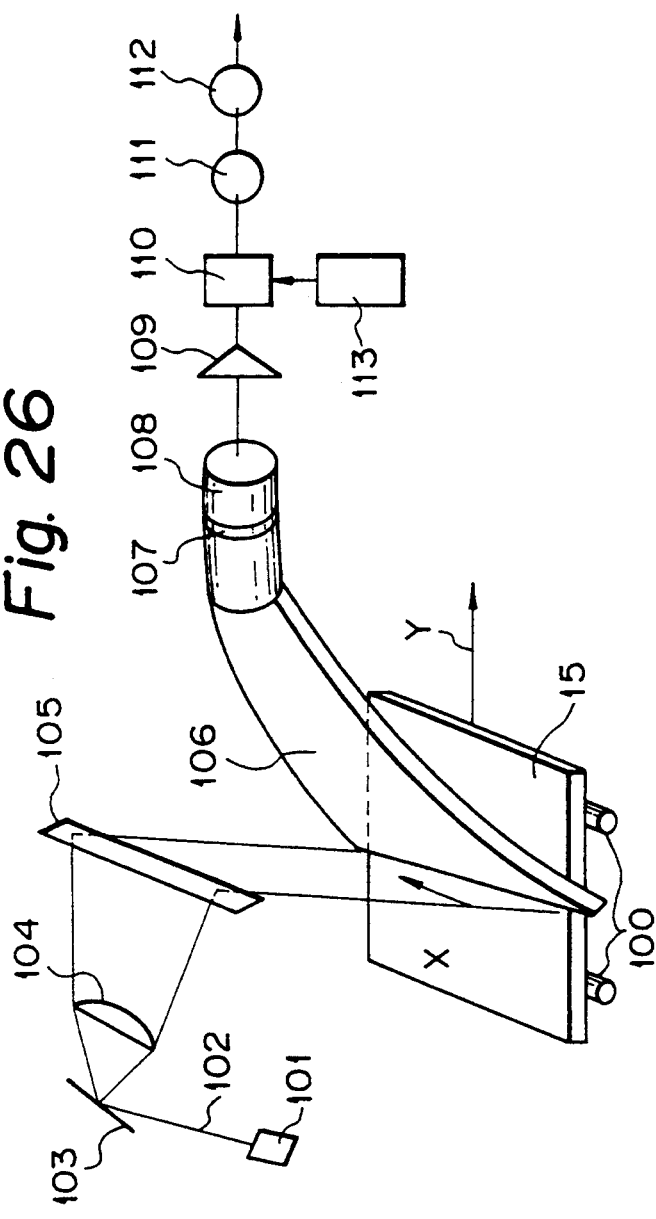
FIG. 26 is a diagram illustrating the construction of the reading portion 23 in FIGS. 24 and 25.

FIG. 26 is a diagram illustrating the construction of the reading portion 23 in FIGS. 24 and 25. In FIG. 26, reference numeral 100 denotes a roller, 101 denotes a laser source, 102 denotes a laser beam; 103 denotes a scanning mechanism, 104 denotes an optical system for adjusting a beam shape, 105 denotes a reflection mirror, 106 denotes a light concentrating device, 107 denotes an optical filter, 108 denotes a photoelectric converter, 109 denotes a LOG amplifier; 110 denotes an analog to digital converter, 111 denotes a frame memory, 112 denotes a storage medium, and 113 denotes an analog to digital converter controller.

The accelerated phosphorescent panel 15 is moved (secondary scanned) in the Y direction by roller 100 in the apparatus 20 (FIG. 24) or 40 (FIG. 25). The laser beam 102 output as an excitation beam from the laser source 101 is reflected by the scanning mechanism 103. The shape of the laser beam is adjusted in the optical system 104, which contains, for example, a fθ-lens, and the shaped laser beam is reflected by the mirror 105 to be applied to the accelerated phosphorescent panel 15. The laser beam scans the surface of the accelerated phosphorescent panel 15 in the X direction. Excited by the excitation beam, the accelerated phosphorescent panel 15 emits an accelerated phosphorescent light from a point to which the scanning laser beam is applied. The intensity of the accelerated phosphorescent light corresponds to the density at the point of the radiographic image recorded in the accelerated phosphorescent panel 15 (the intensity of the accelerated phosphorescent light is proportional to an energy of the X-rays applied to the point of the accelerated phosphorescent panel 15, and the proportion ratio can vary by the intensity of the excitation beam). The accelerated phosphorescent light is collected by the light concentrating device 106, which is constituted by an optical fiber array. The collected accelerated phosphorescent light passes through the optical filter 107, and is converted to an electric signal in the photoelectric converter 108. The electric signal is logarithmically amplified by the LOG amplifier 109, and is converted to a digital signal in the analog to digital converter 110, where the sampling time is controlled by the analog to digital converter controller 113. The digital signal indicating a pixel value of the radiographic image, is temporarily stored in the frame memory 111, and then stored in a storage device 112, such as a magnetic disc or an optical disc. The image processing apparatus 25 reads the digital radiographic image (original pixel values) from the storage medium 112 for processing the radiographic image.

Figure 27:
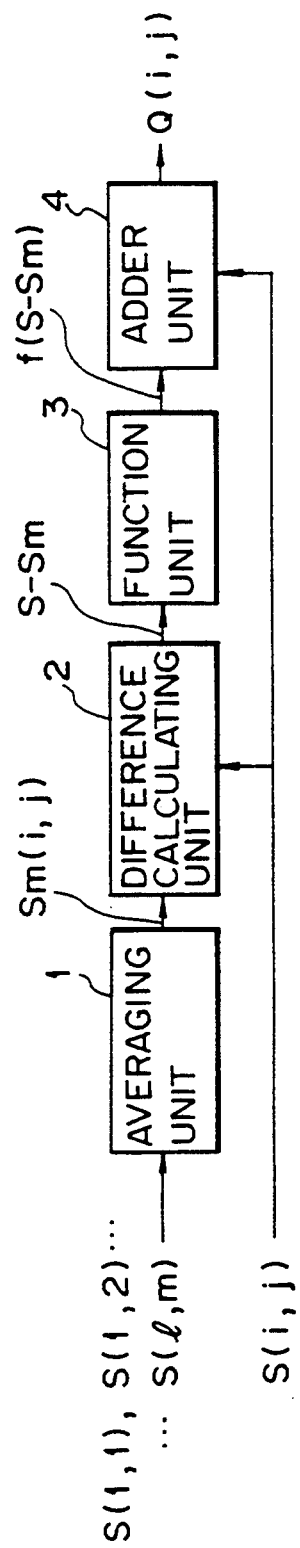
FIG. 27 illustrates a construction of the image processing apparatus 25 in FIGS. 24 and 25.

FIG. 27 illustrates a construction of the image processing apparatus 25 in FIGS. 24 and 25, which realizes the above-mentioned operations according to the present invention. As indicated in FIG. 27, the image processing apparatus 25 comprises: an averaging unit 1 for calculating an average ($S_m$) of original image data of an averaging area around each pixel of the above radiographic image; a difference calculating unit 2 for calculating a difference $S-S_m$ between the original image data S and the average $S_m$; a function unit 3 for calculating a value of a function $f(S-S_m)$; and an adder unit 4 for adding the value of the function $f(S-S_m)$ to the original pixel value S.

According to the first aspect of the present invention, the above function $f(S-S_m)$ varies with the above difference $S-S_m$ so that the absolute value $|f(S-S_m)|$ of the function $f(S-S_m)$ varies in accordance with an increasing monotonic function of the absolute value $|S-S_m|$ of the difference between the original image data S and the average $S_m$ when the absolute value $|S-S_m|$ of the difference between the original image data S and the average $S_m$ is less than a predetermined value, and the absolute value $|f(S-S_m)|$ of the function $f(S-S_m)$ varies in accordance with a decreasing monotonic function of the absolute value $|S-S_m|$ of the difference between the original image data S and the average $S_m$ when the absolute value $|S-S_m|$ of the difference between the original image data S and the average $S_m$ is more than the predetermined value. The characteristic of the absolute value $|f(S-S_m)|$ of the function $f(S-S_m)$ exists in at least one of two ranges of the values of $S-S_m$, where the difference between the original image data S and the average $S_m$ is positive in one range, and the difference between the original image data S and the average $S_m$ is negative in the other range.

In the first embodiment of the present invention, the above function $f(S-S_m)$ may be a non-odd function of the difference $S-S_m$ between the original image data S and the average $S_m$.

The above absolute value $|f(S-S_m)|$ of the above function $f(S-S_m)$ may satisfy a relationship, $$|f(S-S_m)| > |f(S_m-S)|.$$

The above absolute value $|f(S-S_m)|$ of the above function $f(S-S_m)$ may satisfy a relationship, $$|f(S-S_m)| < |f(S_m-S)|.$$

In the first embodiment of the present invention, the above processed image data Q may be obtained by using an equation, $$Q = S \times \{F_1(P)/F_2(P)\}/\{F_2(1)/F_1(1)\} \qquad (5)$$

where $P = S/S_m$, $F_2(P)$ is a function of second degree or higher, and $F_1(P)$ is a function of a degree lower than the degree of the function $F_2(P)$.

The above functions $F_1(P)$ and $F_2(P)$ may be respectively determined in accordance with equations, $$F_1(P) = A + B + C \qquad (6)$$

$$F_2(P) = A \times P^2 + B \times P + C \qquad (7)$$

where A, B, and C are each a constant, determined for a range wherein $P > 1$ and a range wherein $P < 1$, respectively.

According to the second aspect of the present invention, the above function $f(S-S_m)$ is a non-odd function of the difference $S-S_m$ between the original image data S and the average $S_m$.

In the second embodiment of the present invention, the above absolute value $|f(S-S_m)|$ of the above function $f(S-S_m)$ may satisfy a relationship, $$|f(S-S_m)| > |f(S_m-S)|.$$

In the second embodiment of the present invention, the above absolute value $|f(S-S_m)|$ of the above function $f(S-S_m)$ may satisfy a relationship, $$|f(S-S_m)| < |f(S_m-S)|.$$

We claim:

1. A method for processing a radiographic image, comprising:
generating and transmitting X-rays through a body using an X-ray generator to produce original image data;

calculating an average ($S_m$) of the original image data of an averaging area around each pixel of said radiographic image;

transforming the original image data of each pixel of said radiographic image to obtain a processed image data of each pixel in accordance with an equation, $$Q = S + f(S - S_m)$$

where Q is the processed image data, S is the original image data, and $f(S-S_m)$ is a function of the difference between the original image data S and the average $S_m$, and has a characteristic in at least one of first and second ranges of the difference between the original image data S and the average $S_m$, the difference between the original image data S and the average $S_m$ is positive in said first range and negative in said second range, and according to said characteristic, the absolute value $|Q-S|$ of the difference between the processed image data Q and the original image data S varies in accordance with an increasing monotonic function of the absolute value $|S-S_m|$ of the difference between the original image data S and the average $S_m$ when the absolute value $|S-S_m|$ of the difference between the original image data S and the average $S_m$ is less than a predetermined value, and the absolute value $|Q-S|$ of the difference between the processed image data Q and the original image data S varies in accordance with a decreasing monotonic function of the absolute value $|S-S_m|$ of the difference between the original image data S and the average $S_m$ when the absolute value $|S-S_m|$ of the difference between the original image data S and the average $S_m$ is more than the predetermined value; and outputting the processed image data to output device.

2. A method according to claim 1, wherein said function $f(S-S_m)$ is a non-odd function of the difference $S-S_m$ between the original image data S and the average $S_m$.

3. A method according to claim 2, wherein said absolute value $|f(S-S_m)|$ of said function $f(S-S_m)$ satisfies a relationship, $$|f(S-S_m)| > |f(S_m-S)|.$$

4. A method according to claim 2, wherein said absolute value $|f(S-S_m)|$ of said function $f(S-S_m)$ satisfies a relationship, $$|f(S-S_m)| < |f(S_m-S)|.$$

5. A method according to claim 1, wherein said processed image data Q is obtained by using an equation, $$Q = S \times \{F_1(P)/F_2(P)\}/\{F_2(1)/F_1(1)\}$$

where $P = S/S_m$, $F_2(P)$ is a function of second degree or higher, and $F_1(P)$ is a function of a degree lower than the degree of the function $F_2(P)$.

6. A method according to claim 5, wherein said functions $F_1(P)$ and $F_2(P)$ are respectively determined in accordance with equations, $$F_1(P) = A + B + C$$

$$F_2(P) = A \times P^2 + B \times P + C$$

where A, B, and C are each a constant, determined for a range wherein $P > 1$ and a range wherein $P < 1$, respectively.

7. A method for processing a radiographic image, comprising:

generating and transmitting X-rays though a body using an X-ray generator to produce original image data;

calculating an average ($S_m$) of the original image data of an averaging area around each pixel of said radiographic image;

transforming the original image data of each pixel of said radiographic image to obtain a processed image data of each pixel in accordance with an equation, $$Q = S + f(S - S_m)$$

where Q is the processed image data, S is the original image data, and $f(S-S_m)$ is a non-odd function of the difference $S-S_m$ between the original image data S and the average $S_m$; and outputting the processed image data to output device.

8. A method according to claim 7, wherein said absolute value $|f(S-S_m)|$ of said function $f(S-S_m)$ satisfies a relationship, $$|f(S-S_m)| > |f(S_m-S)|.$$

9. A method according to claim 7, wherein said absolute value $|f(S-S_m)|$ of said function $f(S-S_m)$ satisfies a relationship, $$|f(S-S_m)| < |f(S_m-S)|.$$

10. A method according to claim 1, wherein said function $f(S-S_m)$ is respectively determined for a plurality of anatomical regions of said radiographic image.

11. An apparatus for processing a radiographic image, comprising:

an X-ray generator generating X-rays through a body to produce original image data;

a memory in which original image data is stored;

an image processor comprising:

averaging means for calculating an average $S_m$ of the original image data of an averaging area around each pixel of said radiographic image, and transforming means for transforming the original image data of each pixel of said radiographic image to obtain a processed image data of each pixel in accordance with an equation $$Q = S + f(S - S_m)$$

where Q is the processed image data, S is the original image data, and $f(S-S_m)$ is a function of the difference between the original image data S and the average $S_m$, and has a characteristic in at least one of first and second ranges of the difference between the original image data S and the average $S_m$, the difference between the original image data S and the average $S_m$ is positive in said first range and negative in said second range, and according to said characteristic, the absolute value $|Q-S|$ of the difference between the processed image data Q and the original image data S varies in accordance with an increasing monotonic function of the absolute value $|S-S_m|$ of the difference between the original image data S and the average $S_m$ when the absolute value $|S-S_m|$ of the difference between the original image data S and the average $S_m$ is less than a predetermined value, and the absolute value $|Q-S|$ of the difference between the processed image data Q and the original image data S varies in accordance with a decreasing monotonic function of the absolute value $|S-S_m|$ of the difference between the original image data S and the average $S_m$ when the absolute value $|S-S_m|$ of the difference between the original image data S and the average $S_m$ is more that the predetermined value;

storing means for storing said processed image data; and a display device displaying said processed image data.

12. An apparatus according to claim 11, wherein said function $f(S-S_m)$ is a non-odd function of the difference $S-S_m$ between the original image data S and the average $S_m$.

13. An apparatus according to claim 12, wherein said absolute value $|f(S-S_m)|$ of said function $f(S-S_m)$ satisfies a relationship, $$|f(S-S_m)| > |f(S_m-S)|.$$

14. An apparatus according to claim 12, wherein said absolute value $|f(S-S_m)|$ of said function $f(S-S_m)$ satisfies a relationship, $$|f(S-S_m)| < |f(S_m-S)|.$$

15. An apparatus according to claim 11, wherein said processed image data Q is obtained by using an equation, $$Q = S \times \{F_1(P)/F_2(P)\}/\{F_2(1)/F_1(1)\}$$

where $P = S/S_m$, $F_2(P)$ is a function of second degree or higher, and $F_1(P)$ is a function of a degree lower than the degree of the function $F_2(P)$.

16. An apparatus according to claim 15, wherein said functions $F_1(P)$ and $F_2(P)$ are respectively determined in accordance with equations, $$F_1(P) = A + B + C$$

$$F_2(P) = A \times P^2 + B \times P + C$$

where A, B, and C are each a constant, determined for a range wherein $P>1$ and a range wherein $P<1$, respectively.

17. An apparatus according to claim 16, further comprising third storing means for storing values of said functions $F_1(P)$ and $F_2(P)$ which are determined in advance for respective values of the original image data S and the average $S_m$, for a range wherein $P>1$ and a range wherein $P<1$, respectively; and said transforming means reads the values stored in the third storing means corresponding to the original image data S, the average $S_m$, and said range, for obtaining the processed image data Q in accordance with the equation, $$Q = S \times \{F_1(P)/F_2(P)\}/\{F_2(1)/F_1(1)\}.$$

18. An apparatus for processing a radiographic image, comprising:

an X-ray generator generating X-rays through a body to produce original image data;

a memory in which original image data is stored;

an image processor comprising:

averaging means for calculating an average $S_m$ of the original image data of an averaging area around each pixel of said radiographic image, and transforming means for transforming the original image data of each pixel of said radiographic image to obtain a processed image data of each pixel in accordance with an equation, $$Q = S + f(S-S_m)$$

where Q is the processed image data, S is the original image data, and $f(S-S_m)$ is a non-odd function of the difference $S-S_m$ between the original image data S and the average $S_m$;

storing means for storing said processed image data; and a display device displaying said processed image data.

19. An apparatus according to claim 18, wherein said absolute value $|f(S-S_m)|$ of said function $f(S-S_m)$ satisfies a relationship, $$|f(S-S_m)| > |f(S_m-S)|.$$

20. An apparatus according to claim 18, wherein said absolute value $|f(S-S_m)|$ of said function $f(S-S_m)$ satisfies a relationship, $$|f(S-S_m)| < |f(S_m-S)|.$$

* * * * *

UNITED STATES PATENT AND TRADEMARK OFFICE
CERTIFICATE OF CORRECTION

PATENT NO. : 5,369,572
DATED : NOVEMBER 29, 1994
INVENTOR(S) : Takahiro HARAKI, et al.

It is certified that error appears in the above-indentified patent and that said Letters Patent is hereby corrected as shown below:

IN THE DRAWINGS

Sheet 15 of 17, FIG. 24, block 27, "DISPLY" should be --DISPLAY--.

Col. 1, line 58, "1xm" should be --nxn--.

Col. 7, line 32, "$|S_m|$" should be --$|S-S_m|$--;

line 66, "C=65" should be --C=64--.

Col. 16, line 6, "though" should be --through--.

Signed and Sealed this

Twenty-first Day of February, 1995

Attest:

BRUCE LEHMAN

Attesting Officer    Commissioner of Patents and Trademarks